US008397045B2

(12) United States Patent
Odaira

(10) Patent No.: US 8,397,045 B2
(45) Date of Patent: Mar. 12, 2013

(54) MEMORY MANAGEMENT DEVICE, MEMORY MANAGEMENT METHOD, AND MEMORY MANAGEMENT PROGRAM

(75) Inventor: Rei Odaira, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 12/977,059

(22) Filed: Dec. 22, 2010

(65) Prior Publication Data
US 2011/0161615 A1 Jun. 30, 2011

(30) Foreign Application Priority Data
Dec. 25, 2009 (JP) ................................. 2009-294515

(51) Int. Cl.
G06F 12/00 (2006.01)
(52) U.S. Cl. ........ 711/166; 711/147; 711/156; 711/170; 707/813
(58) Field of Classification Search .................. 711/166, 711/147, 156, 170; 707/813
See application file for complete search history.

(56) References Cited

U.S. PATENT DOCUMENTS

| 7,975,114 | B2* | 7/2011 | Tene et al. ...................... 711/159 |
| 8,028,008 | B2* | 9/2011 | Kilner et al. .................. 707/813 |
| 8,219,587 | B2* | 7/2012 | Odaira ........................... 707/791 |
| 2010/0005265 | A1* | 1/2010 | Odaira ........................... 711/163 |
| 2010/0122041 | A1* | 5/2010 | Nakaike et al. ............... 711/147 |

FOREIGN PATENT DOCUMENTS

| JP | 2001-184254 | 7/2001 |
| JP | 2004-246753 | 2/2004 |
| JP | 3939975 | 7/2007 |
| JP | 2009-37546 | 2/2009 |

OTHER PUBLICATIONS

Tamar Domani, et al. "Thread-Local Heaps for Java". In Proceedings of the International Symposium on Memory Management, pp. 76-87, 2002.
Phil McGachey, et al. "Concurrent GC leveraging transactional memory", In Proceedings of 13th ACM SIGPLAN Symposium on principles & practice of parallel program., 217-226, 08.
Anon., "Java SE for Embedded Devices", pp. 1-2, downloaded from http://www.oracle.com/us/technologies/java/index.html, Dec. 20, 2010, Oracle Corp., Redwood City, CA.

* cited by examiner

Primary Examiner — Stephen Elmore
(74) Attorney, Agent, or Firm — Gail H. Zarick; Otterstedt, Ellenbogen & Kammer, LLP

(57) ABSTRACT

One or more embodiments provide a technique of improving the conventional thread-local garbage collection (GC) so as to avoid fragmentation. A memory management device having a plurality of processors implementing transactional memory includes a write barrier processing unit which, when performing write barrier in response to initiation of a pointer write operation, registers an object that is located outside of a local area and that has a pointer pointing to an object located in the local area in a write log so as to set it as a target of conflict detection, and a garbage collector which, provided that no conflict is detected, copies a live shared object in the local area to the outside of the local area and collects any unwanted object irrespective of whether it is shared or not.

11 Claims, 9 Drawing Sheets

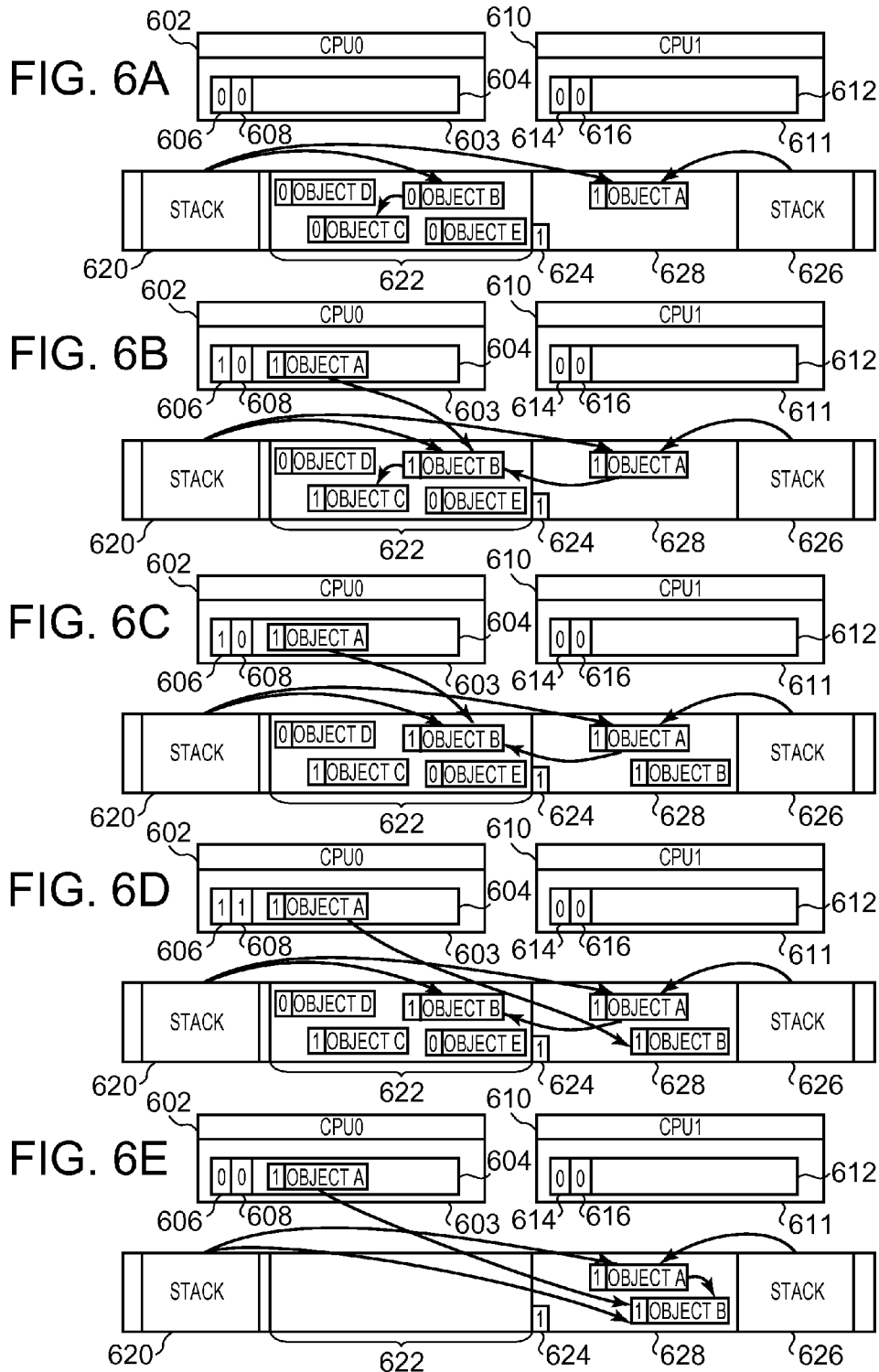

|  | Live | Dead |
|---|---|---|
| Thread-local | perform compaction in thread-local heap, or force it out | collect it |
| Global | Conventional Technique: fragmentation<br><br>Present Invention: force it out of thread-local heap (Fragmentation if thread-local heap includes at least one object that is global and accessed from multiple threads) | Conventional Technique: fragmentation<br><br>Present Invention: collect it (fragmentation if thread-local heap includes at least one object that is global and accessed from multiple threads) |
| global and accessed from multiple threads | Conventional Technique: fragmentation<br><br>Present Invention: abort and fragmentation | Conventional Technique: fragmentation<br><br>Present Invention: abort and fragmentation |

FIG. 8

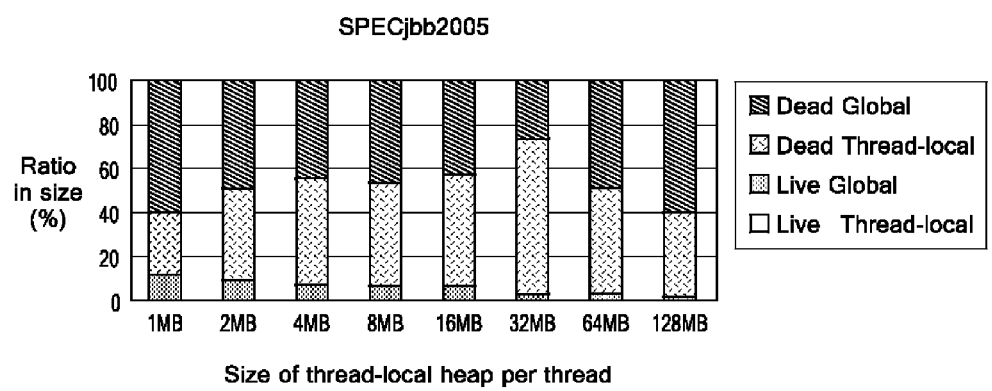

FIG. 9

MEMORY MANAGEMENT DEVICE, MEMORY MANAGEMENT METHOD, AND MEMORY MANAGEMENT PROGRAM

CROSS-REFERENCE TO RELATED APPLICATION(S)

This application claims foreign priority to Japanese Patent application 2009-294515 filed 25 Dec. 2009, the complete disclosure of which is expressly incorporated herein by reference in its entirety for all purposes.

FIELD OF THE INVENTION

The present invention relates to the electrical, electronic and computer arts, and, more particularly, to memory management and the like.

BACKGROUND OF THE INVENTION

Garbage Collection (hereinafter, simply referred to as "GC") is widely used so as to safely and automatically collect objects which are allocated by a program during execution thereof. To perform the GC in a multi-thread application where a plurality of threads operate in parallel and share a storage area, all the application threads (hereinafter, simply referred to as "threads") need to be stopped. This means a degraded responsiveness of the processing. In a web application and other applications where responsiveness is a significant issue, occurrence of pauses due to the GC is a cause for concern.

A conventional technique for solving the above problems is disclosed in Japanese Patent No. 3939975, hereinafter referred to as Patent Document 1. A garbage collection device according to Patent Document 1 includes: allocation means, at the start of execution of methods constituting an application program, for allocating a memory area for each method, and recording correspondences between the allocated memory areas and the methods as well as relationships between the allocated memory areas in terms of the time when they were allocated; moving means, in the case where an object in a first memory area for a first method is referenced from a second memory area for a second method which has been allocated prior to the first memory area, for moving the object to the second memory area; and releasing means, upon completion of one of the methods, for releasing the memory area corresponding to the method.

Another conventional technique for solving the above problems is disclosed in Japanese Unexamined Patent Publication No. 2001-184254, hereinafter referred to as Patent Document 2. The technique of Patent Document 2 is used in an information processor which includes: reference and update prohibiting means for prohibiting an object located in a first space from being referenced or updated by a program prior to initiation of a garbage collection; and exceptional processing performing means, in the case where the garbage collection is executed and a process of referencing and updating the object that has been prohibited from being referenced or updated is to be performed by the program, for performing exceptional processing that does not hamper that process; wherein the technique is characterized in that, as the exceptional processing, the object that is to be referenced and updated by the program, which has been prohibited from being referenced or updated in the first space, is copied into a second space, and a pointer pointing to the object is altered to a pointer pointing to the new copy of the object in the second space.

There is yet another conventional technique for solving the above problems according to which, assuming that most objects are unreachable from threads other than its creator thread during its lifetime, objects are collected in the state where not all the threads are stopped (which technique is hereinafter referred to as a "thread-local GC") (see T. Domani et al. "Thread-Local Heaps for Java." Proceedings of the International Symposium on Memory Management, pp. 76-87, 2002, hereinafter referred to as Non-Patent Document 1, and expressly incorporated herein by reference in its entirety for all purposes). In the thread-local GC, each thread is provided with a local area dedicated to the thread where objects are allocated, and each object is assigned an attribute (hereinafter, also referred to as a "shared object attribute") indicating whether the object is reachable from more than one thread. When a thread is about to write a pointer into a field of an object, software write barrier is executed, and the attribute of any object that would likely be referenced by another thread (hereinafter, referred to as a "shared object") is changed to "shared".

Thereafter, when one of the local areas has become full or exhausted, a GC is performed for that exhausted area, so as to collect any objects that are no longer necessary (or, unwanted objects) from among the objects having an attribute other than "shared". According to the thread-local GC, any shared object that may be referenced by another thread is identified on the basis of its attribute and refrained from being collected. This eliminates the need of suspending the other threads.

In the thread-local GC, however, a shared object cannot be collected or copied to another area because it would likely be referenced by another thread. This causes fragmentation in the local area in the thread-local GC. Although the number of shared objects that are left in a local area after one-time thread-local GC may be small, as the same local area is used repeatedly, the fragmentation will become noticeable, and thus the need of assigning another local area may possibly arise.

A conventional technique for solving the above-described problem of fragmentation is disclosed in Japanese Unexamined Patent Publication No. 2009-37546, hereinafter referred to as Patent Document 3. According to the technique of Patent Document 3, a memory is provided with a thread-local area which is assigned to each of one or more threads that are generated in correspondence with a program and operate in parallel, and a global area which is shared by the threads. Data which is referenced exclusively by a thread is allocated in the thread-local area, while data which is referenced by other threads is allocated in the global area, and in the case where the data in the thread-local area is to be referenced by one of the other threads, the data that would likely be referenced is moved to the global area before it is actually referenced.

Another conventional technique for solving the above problem of fragmentation is disclosed in Japanese Unexamined Patent Publication No. 2004-246753, hereinafter referred to as Patent Document 4. According to the technique of Patent Document 4, an object generated by an application program is arranged in a thread-local heap that is associated with a thread, and when the threads that can reference the generated object are changed, the object is moved to an appropriate thread-group heap (that corresponds to the set of threads that can reference that object). At the lime of collecting an object that is no longer necessary, only the threads that are able to reference the unwanted object are stopped.

There is yet another conventional technique of combining a copy-based concurrent GC with transactional memory that has been widely studied as a way of reducing the synchronization overhead for shared objects (see Phil McGachey et al., "Concurrent GC Leveraging Transactional Memory", in Proceedings of the 13th ACM SIGPLAN Symposium on Principles and Practice of Parallel Programming, pp. 217-226, 2008, referred to hereinafter as Non-Patent Document 2).

SUMMARY OF THE INVENTION

Principles of the invention provide techniques for memory management.

According to a first aspect of the present invention, there is provided a memory management device having a plurality of processors implementing transactional memory, which device includes: a memory having its part assigned as a plurality of local areas corresponding respectively to a plurality of running threads; a write barrier processing unit, operative in response to initiation of an operation by one of the threads to write a pointer into a shared object having an attribute of "shared," to find any object that is reachable by recursively tracing references, starting at an object pointed to by the pointer to be written, and change an attribute of the found object to "shared" so as to make it a shared object, and on the condition that any one of the shared objects including the shared object into which the pointer is to be written is located outside of the local area corresponding to the thread and has a pointer pointing to an object located in the local area, to register the pointer in the shared object satisfying the condition in a write log of the transactional memory so as to set the same as a target of conflict detection, and also register the shared object satisfying the condition in a copy list for the thread; and a garbage collector, operative in response to exhaustion of one of the plurality of local areas, in the case where no conflict is detected in relation to the thread to which the exhausted local area has been assigned, to copy any object reachable from any one of the shared objects registered in the copy list for the thread to the outside of the exhausted local area, and, for each shared object registered in the copy list, buffer write data for modifying the pointer to the copied object so as to point to a new copy of the object and register the same in the write log of the transactional memory, commit a transaction, and collect any unwanted object irrespective of its attribute, and in the case where a conflict is detected in relation to the thread to which the exhausted local area has been assigned, to collect from the local area any unwanted object having an attribute other than "shared."

Preferably, the memory management device further includes a conflict handler which, in response to the detection of the conflict, discards the buffered write data and the data registered in the write log of the transactional memory in relation to the shared object for which the conflict has been detected, and prohibits copying of any shared object located in the local area for the thread having the copy list including the shared object for which the conflict has been detected. It is noted that the conflict handler, in response to the detection of the conflict, may further empty the copy list including the shared object for which the conflict has been detected. Furthermore, an inhibit flag may be provided for each of the local areas, which may be set so as to prohibit the copying.

More preferably, in the case where a conflict is detected after initiation of the processing by the garbage collector and before the commitment of the transaction thereby, the conflict handler causes the garbage collector to skip remaining processing down to the commitment of the transaction, and collect only unwanted objects having an attribute other than "shared."

Still preferably, the write barrier processing unit registers, instead of the pointer in the shared object satisfying the condition, an object that is located in the local area and directly referenced by the shared object satisfying the condition, in the write log of the transactional memory so as to set the same as a target of conflict detection, and also registers the object in the copy list for the thread. Then, in the case where no conflict is detected, the garbage collector collects, instead of any unwanted object irrespective of its attribute, any unwanted object except for the objects registered in the copy list, irrespective of its attribute.

According to a second aspect of the present invention, there is provided a memory management device having a plurality of processor implementing transactional memory, which device includes: a memory having its part assigned as a plurality of local areas corresponding respectively to a plurality of running threads; a write barrier processing unit, operative in response to initiation of an operation by one of the threads to write a pointer into a shared object having an attribute of "shared", to find any object that is reachable by recursively tracing references, starting at an object pointed to by the pointer to be written, and change an attribute of the found object to "shared" so as to make it a shared object, and on the condition that any one of the shared objects including the shared object into which the pointer is to be written is located outside of the local area corresponding to the thread and has a pointer pointing to an object located in the local area, to register the pointer in the shared object satisfying the condition in a write log of the transactional memory so as to set the same as a target of conflict detection, and also register the shared object satisfying the condition in a copy list for the thread; a conflict handler, operative in response to detection of a conflict, to discard buffered write data and data registered in the write log of the transactional memory in relation to the shared object for which the conflict has been detected, and mark any object reachable from the shared object that is contained in the copy list and for which the conflict has been detected; and a garbage collector, operative in response to exhaustion of one of the plurality of local areas, to copy any unmarked object reachable from any one of the shared objects registered in the copy list for the thread to which the local area has been assigned, to the outside of the exhausted local area, and, for each shared object registered in the copy list, buffer write data for modifying the pointer to the copied object so as to point to a new copy of the object and register the same in the write log of the transactional memory, commit a transaction, and collect any unwanted object except for the marked objects.

While the present invention has been described above as the memory management device, the present invention may also be understood as a memory management method and a memory management program which are carried out by a computer system that includes a plurality of processors implementing transactional memory and a memory having its part assigned as a plurality of local areas corresponding respectively to a plurality of running threads.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), or (ii) a combination of hardware and software modules; any of (i)-(ii) implement the specific techniques set forth herein, and the software modules are stored in a computer-readable storage medium (or multiple such media).

These and other features and advantages of the present invention will become apparent from the following detailed description of illustrative embodiments thereof, which is to be read in connection with the accompanying drawings.

BRIEF DESCRIPTION OF THE DRAWINGS

FIGS. 6A to 6E each show, by way of example, an operation of an improved thread-local GC according to an embodiment of the present invention in the case where no conflict is detected;

FIG. 8 shows a table listing the operations of the conventional thread-local GC and the improved thread-local GC according to the embodiment of the present invention for each object category;

FIG. 9 shows the ratios of the objects of respective categories in the objects newly generated during a period from a GC to a next GC.

DETAILED DESCRIPTION OF PREFERRED EMBODIMENTS

Figure 1A:
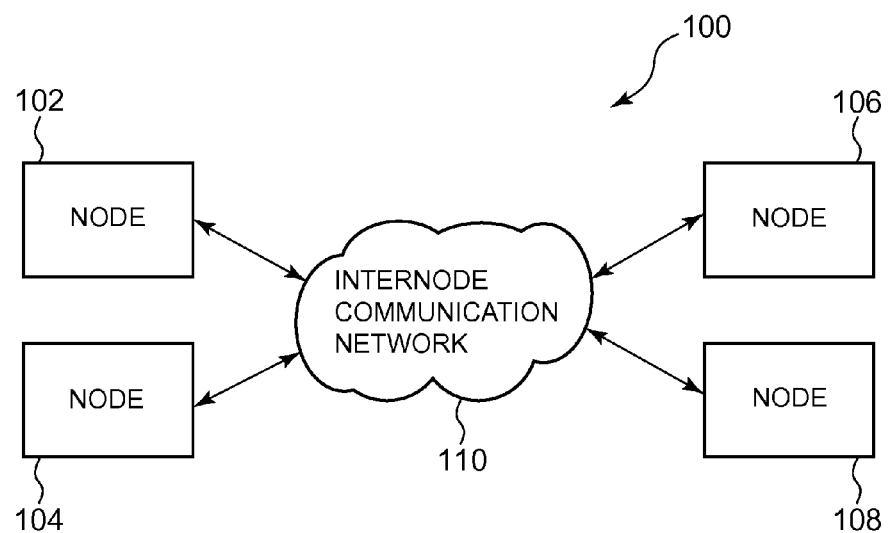
FIG. 1A is an upper-level configuration diagram showing main constituent elements of a computer system to which the present invention is applicable.

One or more embodiments relate to an improved technique for garbage collection in which a local memory area used exclusively by a thread is prepared for each thread, and objects that have become no longer necessary, except for those accessible from other threads, are collected in each local memory area.

One or more embodiments provide one or more advantages as compared to current techniques. With respect to the latter, for example, in the technique disclosed in Patent Document 1 where an area for allocating objects is prepared whenever a method is called, the objects can be collected efficiently only if the lifetime of the objects is shorter than that of the method. Furthermore, in the technique of a copy-based concurrent GC disclosed in Patent Document 2, the read barrier will be actuated frequently, and the overhead when the read barrier is actuated is large because, in the case of copying an object from the first space to the second space, the read barrier for the first space is implemented using the page protecting mechanism of the OS.

In addition, the thread-local GC disclosed in Non-Patent Document 1 poses the issue of fragmentation as described above; the technique disclosed in Patent Document 3 aims at addressing this issue of fragmentation. With the technique of Patent Document 3, however, an object is regarded as a shared object once it is referenced from a plurality of threads. This increases the number of times of global GC and, hence, the frequency of suspending all the threads. Yet further, with the technique disclosed in Patent Document 4, although managing a set of threads that would likely reference an object may lead to a shortened GC pausing time, all the threads need to be stopped for each GC.

Still further, Non-Patent Document 2, which proposes combining the transactional memory with the copy-based concurrent GC, describes that the combination of the transactional memory and the copy-based concurrent GC will result in only a small increase of overhead because the read/write barrier in the software transactional memory and the software read/write barrier in the copy-based concurrent GC have similar functions.

One or more embodiments of the invention provide a technique of improving the conventional thread-local GC so as to avoid fragmentation. According to one or more embodiments of the present invention, which use the conflict detection and the buffering mechanism in transactional memory, a shared object is regarded as a thread-local object, until it is actually accessed from another thread, so that it can be copied to the outside of the local area. As a result, the problem of fragmentation is considerably improved. Furthermore, the frequency of the global GC causing all the threads to be stopped is deceased, resulting in a great reduction of the pausing time.

The inventors of the present invention studied the conventional thread-local GC, and found out that determination of the shared object attribute in it is too conservative. Specifically, in the conventional thread-local GC, the attribute of the object is changed to "shared" at the point in time when there arises a possibility that the object may be referenced from another thread. In a strict sense, however, an object is not shared until a read from or a write to the object is actually performed. Thus, the attribute of the object should remain "thread-local" until the read or write operation is actually performed. To date, however, there was no way of detecting, at a low cost, the event that a thread has read from or written to an object that was allocated by another thread.

The present inventors conducted a further study, during which they focused attention on a conflict detection and a buffering mechanism during a transaction before commitment thereof in transactional memory, and have developed a technique of using the transactional memory in a thread-local GC for a thread of interest so as to detect a reading or writing operation from another thread, and, provided that no such reading or writing operation is detected, copying a shared object to the outside of a heap area used exclusively by the thread of interest, to thereby avoid fragmentation.

Hereinafter, exemplary embodiments of the present invention will be described in detail with reference to the drawings. The following embodiment, however, does not restrict the claimed invention, and all the combinations of the features discussed in the embodiment are not necessarily indispensable for the solving means of the invention. Through the whole description of the embodiment, like numerals denote like elements.

FIG. 1A is an upper-level configuration diagram showing main constituent elements of a computer system 100 to which one or more embodiments of the present invention are applicable. The computer system 100 includes a plurality of nodes 102, 104, 106, and 108. While the system in FIG. 1 includes four nodes, it should be noted that the number of nodes is not restricted to four, but may be any number, at least one. Each node is connected to an internode communication network 110, which enables communication between one node with another node. The internode communication network 110 is provided for supporting communication between devices across the boundaries of the nodes, or specifically, for allowing a processor in one node to access a memory in another node.

In a preferred embodiment, the internode communication network 110 may be a fabric bus, although any alternative means, currently existing or to be developed in the future, may of course be used as the internode communication network 110.

Figure 1B:
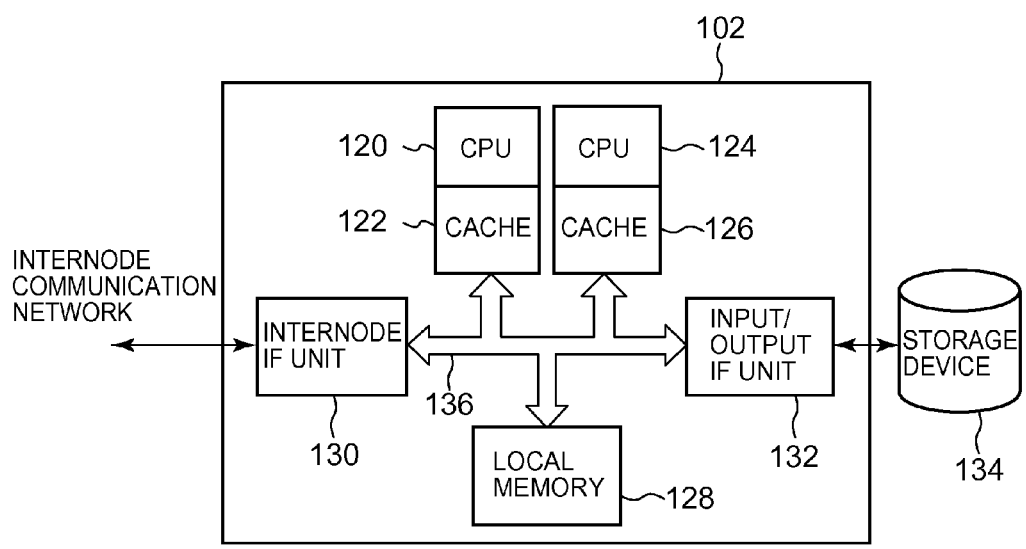
FIG. 1B is a configuration diagram showing main hardware components of a typical node in the computer system shown in FIG. 1A.

FIG. 1B is a configuration diagram showing, by way of example, main hardware components of a typical node in the computer system 100 according to a preferred embodiment. Although the nodes will be collectively referred to as the node 102 for the purpose of consistency in the description, it should be understood that it may be any of the nodes 102, 104, 106, and 108. The node 102 includes a plurality of central processing units (CPUs) 120 and 124, which each carry out basic mechanical processing functions on the basis of instructions and other data from a distributed main memory. Herein, the terms "processor" and "CPU" are regarded as synonymous and they will be used interchangeably. The CPUs 120 and 124 include, or control, caches 122 and 126, respectively, for temporarily storing data and instructions.

In a large-scale multiprocessor computer system, a cache is generally provided in a plurality of levels and a plurality of structures. For example, a CPU may include a level-1 cache (L1 instruction cache) which is used solely for storing instructions to be executed by the CPU, another level-1 cache (L1 data cache), physically separate from the L1 instruction cache, which is used solely for storing data other than the instructions operated by the CPU, and a level-2 cache (L2 cache) which is used for storing and supplying both the instructions and the other data to the L1 instruction cache and the L1 data cache, respectively.

In FIG. 1B, the above-described one or more cache structures are shown in the simple form of one block 122, 126 for each processor, although it should be understood that many other modifications are possible. The CPUs 120 and 124 and the caches 122 and 126, included in the node 102 in the computer system 100 to which one or more embodiments of the present invention are applicable, hardware-implement transactional memory.

Transactional memory has been widely studied as a technique of reducing the synchronization overhead for shared objects. Hardware-implemented transactional memory has been increasingly introduced in commercial CPUs. For using the transactional memory, the range of transaction is firstly designated in a program. Then, a thread, when executing the designated transaction, logs a read from and a write to a shared object. As a result, in the case where other threads read from or write to the same shared object during the execution of the transaction and if the operation performed by any of the threads is a write operation, then a conflict is detected, and a transaction failure is notified to the thread. Further, write data is buffered during the transaction and invisible from other threads until the transaction is committed.

In hardware-implemented transactional memory, a CPU cache and a coherence protocol are used to enable conflict detection in units of cache lines as well as write buffering, both at a low cost. In the hardware-implemented transactional memory, however, the total amount of data that can be read and written within the range of transaction is limited by the CPU cache size. Therefore, conventionally, the transactional memory would have been used almost solely for the purposes of enhancing parallelism of relatively short transactions that read from or write to the shared objects. In contrast, in one or more embodiments of the present invention, the conflict detection and the buffering mechanism in the transactional memory are used in a thread-local GC so as to detect an access to a shared object by a thread other than its creator thread, to thereby allow the shared object to be copied to the outside of the local heap area assigned to that creator thread. The method for hardware-implementation of the transactional memory is well known in the art, and therefore, further description thereof will not be provided here.

The computer system 100 utilizes a distributed main memory, and includes a local memory 128 for each node 102. A sum of the addressable main memory in the computer system 100 is the total sum of the addressable local memories 128 in the respective nodes. All the CPUs in the computer system 100 share the same addressable distributed main memory. Therefore, the real address space in the distributed main memory is consistent for the entire computer system 100, and thus, an arbitrary memory location in a local memory 128 has a unique real address that is same to all the processors and all the nodes.

An internode interface unit 130 connects the node 102 with the internode communication network 110, so as to allow the node 102 to communicate with other nodes in the computer system 100. The internode interface unit 130 may include a cache or a buffer for temporarily storing data being transmitted between the nodes.

An input/output interface unit 132 provides communication to at least one input/output device (a storage device 134 in the case of FIG. 1B) via at least one input/output bus. The input/output bus may be of any type suitable for communication with a conventional input/output device such as a direct access storage device (DASD), a tape device, a workstation, a printing device, or a remote communication adaptor for communication with a remote device or another computer system via a dedicated communication line or a network. For example, the input/output bus may be an industrial standard PCI bus. It should be understood that each node 102 does not necessarily have to include the input/output interface unit 132 or an input/output device connected thereto.

An internal node bus 136 provides communication between various components in the node 102. Specifically, the internal node bus 136, in response to memory accesses from CPUs 120 and 124, transfers data between the local memory 128 and the caches 122 and 126 of the respective CPUs 120 and 124. By monitoring logic in the local memory 128, either one or both of the internode interface unit 130 and the internal node bus 136 determine whether each real address to which the memory access has been requested is included in the local memory 128 of the node 102 or in a local memory of another (remote) node, and in accordance with the determined result, the internal node bus 136 transmits the memory access to the local memory 128 or to the internode interface unit 130 for communication with that remote node.

While the computer system 100 shown in FIG. 1A includes four nodes and the typical node shown in FIG. 1B includes two CPUs and other devices, it should be understood that FIGS. 1A and 1B only illustrate a possible configuration of the computer system, and the number and types of the devices included in the configuration are not restricted to those illustrated. It should also be understood that all the nodes do not have to be identical, and that all the nodes do not have to include the CPUs of the same number or the addressable local memories of the same capacity.

Figure 2:
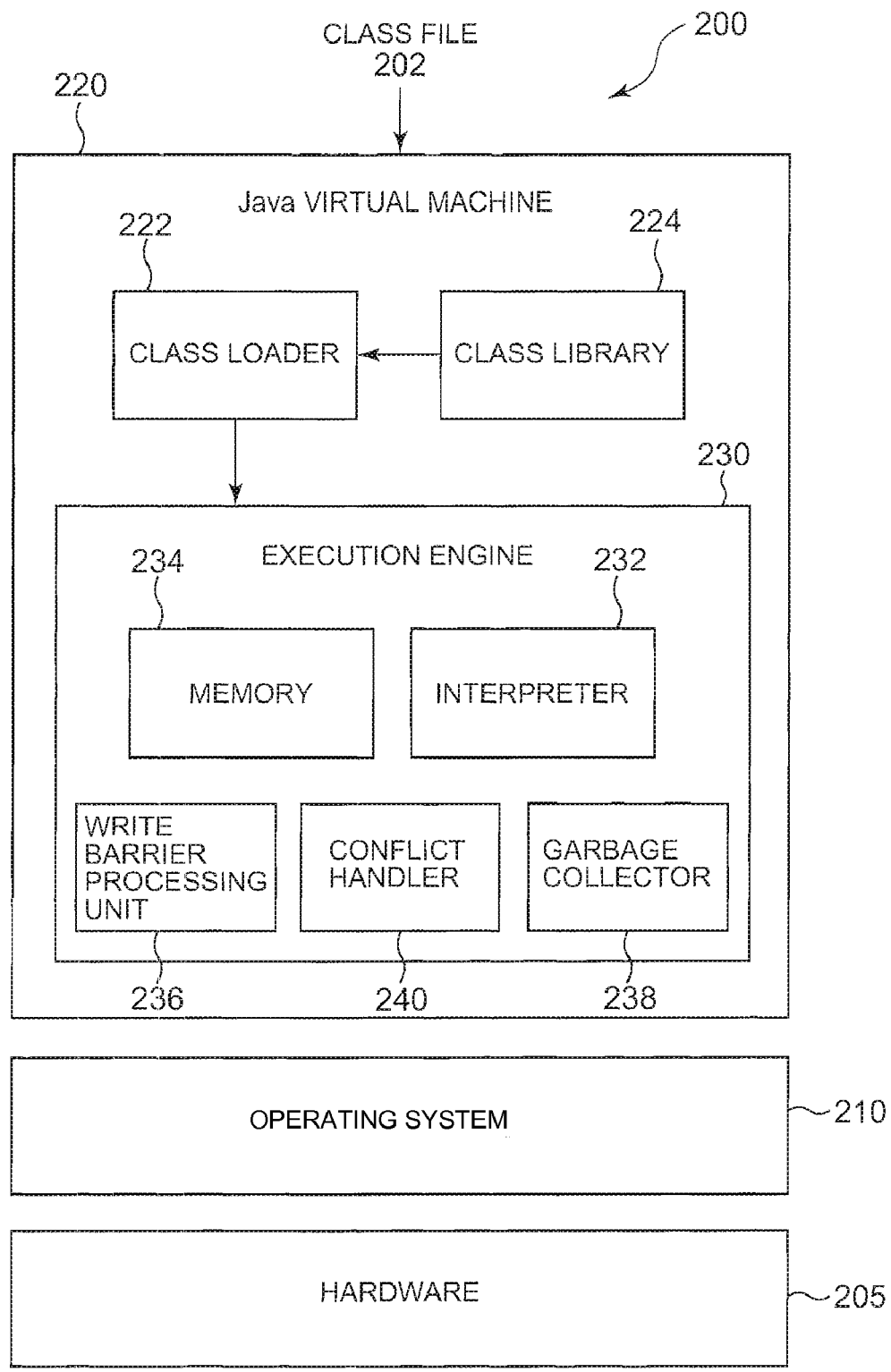
FIG. 2 is a functional block diagram of a memory management device 200 according to an embodiment of the present invention.

FIG. 2 is a functional block diagram of a memory management device 200 according to an embodiment of the present invention. The memory management device 200 according to the exemplary embodiment is implemented using hardware 205, which is the computer system described above with reference to FIG. 1. Although FIG. 2 shows the memory management device 200 as a JAVA runtime environment, which will be described below by way of example, it should be understood that the present invention is applicable, e.g., to Common Language Runtime (CLR) or any other common runtime environment that absorbs a difference between platforms and provides class library, GC, and other services.

JAVA is a language that was developed by Sun Microsystems. Information about JAVA software tools and JAVA developer tools are available online. Use of JAVA. JAVA applications, and creation of JAVA applets are well known in the art, and thus, detailed description thereof will not be provided here. The JAVA source code written by a software developer is not compiled into a format designed for a specific platform, but complied into an intermediate form, called a bytecode, which can be executed in any system having a runtime environment. The JAVA bytecode is moved as a class file 202, which will be described later, from the local hard disk (see the storage device 134 in FIG. 1B) or another computer system to a JAVA virtual machine 220 via the input/output interface unit 132.

The JAVA virtual machine 220 is a platform which allows a JAVA application, or a web browser in the case of a JAVA applet, to run through the entire system, irrespective of an operating system 210 and the underlying hardware 205. The JAVA virtual machine 220 receives a program expressed by a JAVA bytecode, which is a machine-independent instruction, and converts it into a machine-dependent, native instruction. Then, the JAVA virtual machine 220 executes the resultant native instruction using a processor included in one of the nodes described above with reference to FIG. 1B, directly or via the operating system 210. Examples of such an operating system 210 include an AIX operating system and other operating systems such as LINUX.

A JAVA bytecode generated from the JAVA source code is organized as one or more classes. The class represents a template of an object allocated and used during execution of a computer program by the JAVA virtual machine 220. A class is organized as a class file 202, which includes both an executable bytecode and data that the executable bytecode relies on. The class file 202 may also include other information about the object. Such a class file 202 is generated by a JAVA compiler, in accordance with the JAVA source code. The JAVA source code, the JAVA compiler, and the class file are well known in the art, and thus, detailed description thereof will not be provided here.

A class loader 222 selects at least one JAVA class library from a class library 224 for use in a given operation designated by the JAVA bytecode in the class file 202. The class loader 222 then dynamically loads the class file 202 and the selected JAVA class library, by storing the same in a memory 234 of an execution engine 230. It is noted that, prior to storage into the memory 234, the class loader 222 may carry out class verification, in accordance with a method known in the art, to verify conformance to the JAVA security requirements.

An interpreter 232, in response to the load of the class file 202 by the class loader 222, interprets the JAVA bytecodes included in each class file 202 one by one, and performs operations corresponding thereto. As a result, one or more threads are executed by a processor in the node 102.

Interpretation and execution of the JAVA bytecodes by the interpreter 232 are operations well known in the art, and thus, detailed description thereof will not be provided here. The execution engine 230 may include a just-in-time (JIT) compiler (not shown) in addition to the interpreter 232. The JIT compiler converts a series of JAVA bytecodes together prior to execution, thereby reducing the runtime overhead and, thus, improving the execution speed. The operations of the JIT compiler are also well known in the art, and thus, detailed description thereof will not be provided here.

The memory 234 includes a plurality of defined storage areas, which are broadly grouped as stacks and heaps, for execution of the JAVA bytecodes by the interpreter 232. The stack is a storage area that is assigned to each thread whenever a thread is started, for supporting multithreading. The memory 234 also includes a program counter (PC) register.

Generally, a stack in the JAVA virtual machine 220 implements a last-in-first-out (LIFO) data structure. A data unit on a stack is called a "frame", which holds an array of local variables of the method executed by the thread, a stack (an operand stack) for holding data to be processed, and a reference to a runtime constant pool of the class of the method. When a method is started by a thread, frames are added on a stack, and a called method becomes active. When processing of the method is finished, the corresponding frames are deleted, and the calling method that called the method becomes active again.

The heap is a storage area that is allocated at start-up of the JAVA virtual machine 220 and is shared among all the threads. The heap includes an area for storing dynamic data, such as an instance of an object, for which a GC is to be performed, and an area called a "method area" for storing static data such as a class structure. In one or more embodiments of the present invention, the storage area in the heap for which a GC is to be performed includes a plurality of sub-areas. Each sub-area is assigned to a node 102, in which the sub-area constitutes at least a part of its local memory 128. Each sub-area includes a plurality of local areas that correspond respectively to a plurality of threads which are running on the CPU in the node 102 to which the sub-area has been assigned. Each thread allocates objects from its own local area. The locations, sizes, and the numbers of sub-areas and local areas depend on the operating system 210 and the JAVA virtual machine 220. A single node 102 may be assigned a plurality of sub-areas.

In the present embodiment, one bit is set for each object to represent a thread-local attribute, as in the conventional thread-local GC. For example, the attribute may be set in an unused area in the header of the object. As for an object that is known in advance to be reachable from a plurality of threads, its attribute bit may be set as "shared", and the object may be allocated in the heap outside of any of the local areas as a shared object from the beginning. As for any other object, the attribute bit is set as "thread-local", and the object is allocated in a local area as a local object that cannot be accessed from other threads. The objects that are known in advance to be reachable from a plurality of threads include, for example in the case of the JAVA language, a class object, and instances of java.lang.Thread class and its sub-classes.

The write barrier processing unit 236, in response to initiation of an operation by a thread (hereinafter, referred to as a "calling thread") to write a pointer into a shared object having the "shared" attribute, finds one or more objects that are reachable by recursively tracing references, starting at the object that is pointed to by the pointer about to be written, and changes the attribute of any reachable object to "shared". At this time, on the condition that any one of those shared objects including the shared object to which the pointer is to be written is located outside of the local area for the calling thread and has a pointer pointing to an object located in the local area, the write barrier processing unit 236 registers the pointer in the shared object satisfying the above condition in a write log of transactional memory so as to set the same as a target of conflict detection, and also registers the shared object satisfying the above condition in a copy list for the calling thread. It is noted that another condition that the shared object located in the local area assigned to the calling thread can be copied may be added to the above condition.

Here, a copy list is provided for each thread, and is used in a GC that is performed on the local area assigned to the corresponding thread. Specifically, the shared objects registered in the copy list are used to find out any shared object that is located in the local area for which the GC is being performed and that is to be copied into an area outside that local area. When the write barrier processing unit 236 registers the pointer in the shared object satisfying the above condition in the write log of the transactional memory, it does not perform buffering because the written content needs to be visible from other threads.

A garbage collector 238, in response to the event that one of the plurality of local areas has been exhausted, determines whether a conflict has been detected in relation to the thread (hereinafter, referred to as the "target thread") to which the local area has been assigned. The garbage collector 238 then performs a GC on the exhausted local area in accordance with the determined result. Determination for the conflict detection may be made, e.g., on the basis of an inhibit flag that is set by a conflict handler 240, which will be described later.

In the case where no conflict is detected, the garbage collector 238 copies any object that is reachable from any one of the shared objects registered in the copy list for the target thread, from the current location in the local area assigned to the target thread to the outside of the local area. Further, the garbage collector 238 modifies the pointer to the copied object so as to point to the new copy of the object. It is noted that the above-described object copying operation and the pointer modifying operation are each performed by a normal write operation, which involves neither buffering nor registration into a write log.

For each of the shared objects registered in the copy list for the target thread, the garbage collector 238 buffers write data for modifying the pointer to the copied object so as to point to the new copy of the object, registers the same in the write log of the transactional memory, and then commits the transaction. It is noted that the copy list for the target thread may be emptied prior to commitment of the transaction.

The garbage collector 238 then collects any object that has become no longer necessary, irrespective of its attribute. The unwanted objects can be collected irrespective of their attributes because the shared object has already been copied to the outside of the local area and any shared object that has not been copied and remains in the local area is unreachable from any other thread. The objects may be collected using any of the existing GC algorithms, including mark-and-sweep, reference counting, and copying. In the case of using the mark-and-sweep algorithm, the garbage collector 238 marks any object reachable from the register and the stack of the target thread, and collects any unmarked objects. When the collection is complete, the garbage collector 238 starts a new transaction.

On the other hand, in the case where a conflict has been detected, the garbage collector 238 collects any unwanted object whose attribute is not "shared" in the local area assigned to the target thread, as in the conventional thread-local GC. That is, the garbage collector 238 collects any unwanted object from the group of thread-local objects excluding the shared objects. In this case as well, the objects may be collected using any of the existing GC algorithms.

The conflict handler 240, in response to detection of a conflict, discards any buffered write data as well as any data registered in the write log of the transactional memory in relation to the shared object for which the conflict has been detected. The conflict handler 240 may also empty the copy list that includes the shared object for which the conflict has been detected. Then, the conflict handler 240 prohibits copying of the shared objects located in the local area assigned to the thread that has the copy list including the shared object for which the conflict has been detected, i.e., the thread that has logged data and then received a notification of conflict detection. To this end, a one-bit inhibit flag may be provided for each local area, for example, and this inhibit flag may be set to prohibit copying. The conflict detection itself is carried out by hardware using the CPU cache and the coherence protocol, as described above. The conflict handler 240 starts processing when it is called from the thread that has logged and then received a notification of conflict detection.

In the case where a conflict is detected at a point in time after the garbage collector 238 has started the processing that is supposed to be carried out when no conflict is detected and before it commits the transaction, the conflict handler 240 causes the garbage collector 238 to skip the remaining processing that would have to be done before the commitment of the transaction, and to perform the process of collecting the unwanted objects having an attribute other than "shared". On the other hand, when a conflict is detected before the garbage collector 238 starts processing, the conflict handler 240 goes back to the processing immediately before the conflict detection, i.e., to the point interrupted by the conflict detection, and returns the control.

It is noted that the write barrier processing unit 236, the garbage collector 238, and the conflict handler 240 described above are not necessarily executed by independent threads. The write barrier processing unit 236 may be implemented as an application thread calls and executes the corresponding write barrier module. The garbage collector 238 may be implemented as part of the functions of an existing garbage collector, or alternatively, it may be implemented as an application thread calls and executes the corresponding GC module. The conflict handler 240 may also be called and executed by the garbage collector 238 or an application thread. Hereinafter, the improved thread-local GC according to one or more embodiments of the present invention may be called a "copy-based thread-local GC".

In one or more embodiments of the present invention, transactional memory is used, and a transaction is started after unwanted objects are collected by the garbage collector 238 and is completed when the transaction is committed by the garbage collector 238, as described above. This means that the memory write operations by the write barrier processing unit 236 and the garbage collector 238 are both performed during the transaction. In one or more embodiments of the present invention, however, the following three types of memory write operations are prepared so as to allow the write barrier processing unit 236 and the garbage collector 238 to do the memory write operations suitable for their own purposes.

The three types of write operations prepared in one or more embodiments of the present invention are: (1) a normal write operation which involves neither buffering nor registration into a write log; (2) a write operation which does not involve buffering but involves registration into a write log; and (3) a write operation which involves both buffering and registration into a write log. In order to enable the normal write operation in (1) above, a function of executing a normal memory read/write instruction during a transaction is necessary. This function is generally provided by using either a suspend/resume instruction that suspends the transaction, or a special memory read/write instruction for the transaction (hereinafter, simply referred to as a "normal write instruction"). In the example which will be described below, the latter instruction is adopted.

In order to enable the write operation in (2) above which involves only registration into a write log, one of the following two methods (L1 and L2) may be used. In the L1 method, a state is added for each CPU cache line so that it can express the state of being "registered in a write log but not buffered". Furthermore, a "write instruction for logging" for bringing a CPU cache line into this state is prepared. It is noted that this L1 method is adopted in the example described below.

The L2 method is used in the case where it is undesirable to add a state to a CPU cache line. In the L2 method, a "write-through instruction for transaction" is prepared. With this instruction, the value within the CPU cache line and the value within the memory are rewritten at the same time. The problem of this method is that, when the same thread performs a normal write operation on the same cache line as the one including write data that has been buffered, this will be regarded as a conflict in many implementations of the hardware transactional memory. This produces the need for the conflict handler to write the same value again using the write-through instruction for transaction. It is noted that a "write instruction for transaction" for performing the write operation for the transaction in (3) above is well known as a memory write instruction during a general transaction, and thus, detailed description thereof will not be provided here.

Furthermore, in relation to the above-described processing of the conflict handler 240, some embodiments of the present invention require the following functions:

(A) An eager conflict-detecting function. In some embodiments of the present invention, it is necessary to issue a notification to a thread that has logged write data at the point in time when another thread has read or written to that data. It is noted that in the existing implementations of the hardware transactional memory, the conflict is often detected "eagerly" for ease of implementation.

(B) A function of, in the case of detecting a conflict in a write log, issuing a notification of conflict detection to the thread that has logged the data. For implementing strong atomicity, it is easier to issue the notification, not to the thread that has issued the normal memory read/write instruction, but to the thread that has logged the data.

(C) A function of preventing the transaction from being aborted even if a conflict is detected. There are two types of implementations of hardware transaction memory. In one of them, when a conflict is notified, the transaction is automatically rolled back to the starting point. In the other of them, execution jumps to a handler registered in advance, in which software issues an abort instruction. One or more embodiments of the present invention adopt the latter implementation.

(D) A function of preventing the transaction from being aborted even if it is notified that write log or buffered write data has been forced out of a CPU cache. In the hardware transactional memory, it is often the case that a CPU cache of a finite size includes a log and a buffer. In the case where data in the log or the buffer is forced out of the CPU cache, the event is notified to the thread that has registered the data. One or more embodiments of the present invention are implemented such that, even if a thread receives such a notification, it will not automatically abort the transaction.

(E) An abort instruction that causes write log and buffered write data to be discarded but does not cause execution to return to the starting point of the transaction. Such an abort instruction is added if not available.

It is noted that each of the above-described functions (A) to (E) is either a function that has been provided in the currently implemented hardware transactional memory or a function that can be added with simple modification, and thus is known in the art. Therefore, elaborate description of their implementation methods will not be provided here.

Figure 3:
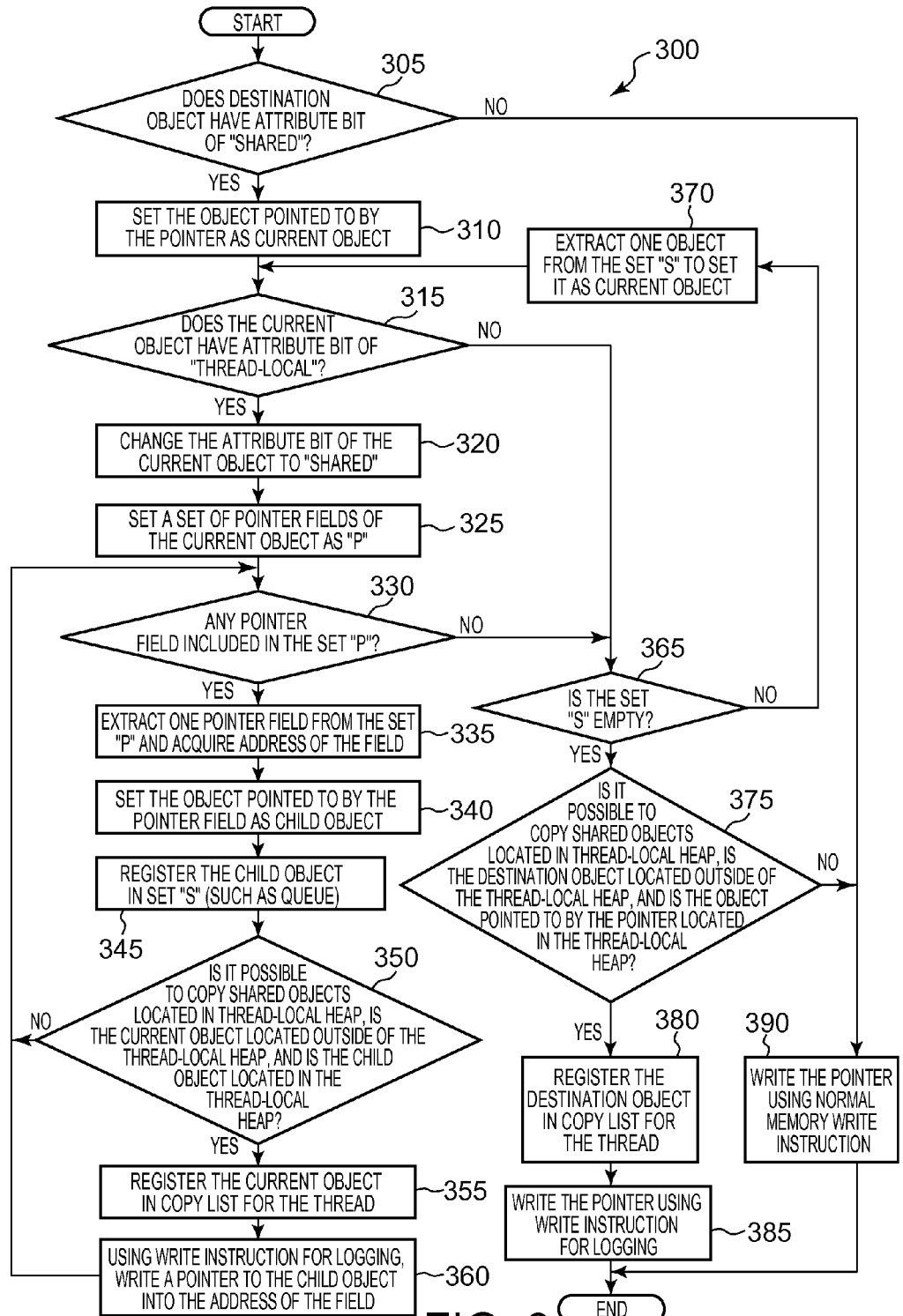
FIG. 3 is a flowchart illustrating, by way of example, a flow of processing performed by a write barrier processing unit 236 according to the embodiment of the present invention.

Hereinafter, process flows of the write barrier processing unit 236, the garbage collector 238, and the conflict handler 240 according to an embodiment of the present invention will be described with reference to FIGS. 3 to 5. FIG. 3 is a flowchart 300 illustrating a flow of the processing performed by the write barrier processing unit 236 according to the embodiment of the present invention. The write barrier processing shown in FIG. 3 is started when a thread that is about to write a pointer calls the write barrier processing unit 236. The write barrier processing unit 236 determines whether the destination object to which a pointer is to be written by the calling thread has an attribute of "shared" (step 305). If the attribute is not "shared" (NO in step 305), the process proceeds to step 390, where the write barrier processing unit 236 writes the pointer into a pointer field of the destination object using a normal memory write instruction, and the process is terminated.

On the other hand, if it is determined in step 305 that the attribute is "shared", the write barrier processing unit 236 sets an object pointed to by the pointer as a current object (step 310). Thereafter, the write barrier processing unit 236 determines whether the attribute bit of the current object is "thread-local" (step 315). If the attribute is "thread-local" (YES in step 315), the write barrier processing unit 236 changes the attribute bit of the current object to "shared" (step 320). The write barrier processing unit 236 further registers a set of pointer fields of the current object as a set P (step 325), and determines whether there is any pointer field in the set P (step 330).

If there is one or more pointer fields in the set P (YES in step 330), the write barrier processing unit 236 extracts one pointer field from the set P to acquire an address of that field (step 335). Then, the write barrier processing unit 236 obtains an object that is pointed to by the extracted pointer field, and registers the obtained object as a child object in a set S (such as a queue) (steps 340 and 345).

Subsequently, for the local area (also referred to as the "thread-local heap") assigned to the calling thread, the write barrier processing unit 236 determines whether shared objects located in that local area can be copied, and whether the current object is located outside of the local area and the child object registered in the set S most recently is located in the local area (step 350). It is noted that the determination as to whether the shared objects in a certain local area can be copied or not may be made on the basis of the inhibit flag that is set for each local area by the conflict handler 240, as described above. Further, the determination as to whether a certain object is located inside or outside of the local area assigned to the calling thread may be made on the basis of the value of the pointer pointing to that object.

If the shared objects within the thread-local heap for the calling thread can be copied and the current object is located outside of that thread-local heap and the child object registered in the set S most recently is located in that thread-local heap (YES in step 350), the write barrier processing unit 236 registers the current object in a copy list for the calling thread, and uses a write instruction for logging to write, into the address acquired in step 335, a pointer to the child object registered in the set S most recently (steps 355 and 360). On the other hand, if NO in step 350, or from step 360, the process returns to step 330 to repeat a series of processing.

On the other hand, if it is determined in step 315 that the attribute of the current object is not "thread-local", or if it is determined in step 330 that there is no pointer field in the set P, the process proceeds to step 365, where the write barrier processing unit 236 determines whether the set S is empty. If the set S is not empty (NO in step 365), the process proceeds to step 370, where the write barrier processing unit 236 extracts one object from the set S, and sets it as a current object. The process then returns to step 315, to repeat the above-described series of processing for the current object.

On the other hand, if YES in step 365, i.e., if the set S is empty, the process proceeds to step 375, where the write barrier processing unit 236 determines, for the thread-local heap assigned to the calling thread, whether shared objects in the thread-local heap can be copied, and whether the destination object to which the pointer is to be written is located outside of the thread-local heap and an object pointed to by the pointer that the calling thread is about to write is located in the thread-local heap. Each of these determinations may be made in the above-described manner.

If the shared objects in the local heap for the calling thread can be copied, and the destination object is located outside of the local heap and the object pointed to by the pointer about to be written by the calling thread is located in the local heap (YES in step 375), then the write barrier processing unit 236 registers the destination object in a copy list for the calling thread, and uses a write instruction for logging to write the pointer that the calling thread was about to write (steps 380 and 385). The process is then terminated. On the other hand, if NO in step 375, the process proceeds to step 390, where the write barrier processing unit 236 uses a normal memory write instruction to write the relevant pointer into the pointer field of the destination object, and the process is terminated.

Figure 4:
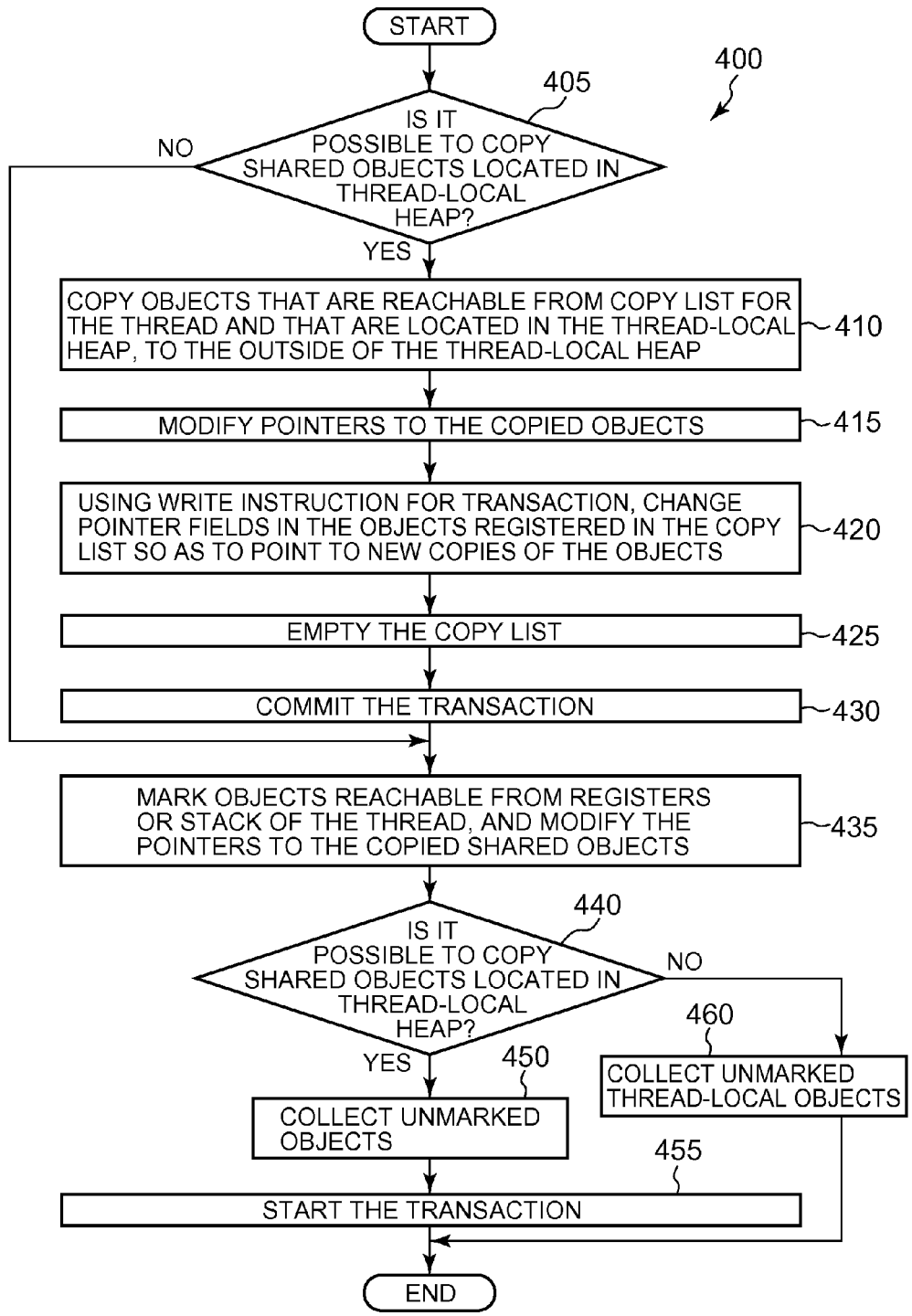
FIG. 4 is a flowchart illustrating, by way of example, a flow of processing performed by a garbage collector 238 according to the embodiment of the present invention.

FIG. 4 is a flowchart 400 illustrating a flow of the processing performed by the garbage collector 238 according to the embodiment of the present invention. While the mark-and-sweep algorithm is used for collecting objects in the flowchart shown in FIG. 4, it should be understood that the way of collecting the unwanted objects is not restricted thereto, as described above. The processing shown in FIG. 4 is started, in response to the event that one of a plurality of local areas has been exhausted, when a thread assigned the exhausted local area calls the garbage collector 238. The garbage collector 238 determines whether shared objects in the exhausted local area (also called the thread-local heap) can be copied (step 405). This determination is for checking whether a conflict has been detected in relation to the thread that called the garbage collector 238, and may be made on the basis of an inhibit flag that is set for each local area by the conflict handler 240, as described above.

If it is possible to copy the shared objects (YES in step 405), the garbage collector 238 copies objects that are reachable from the shared objects registered in the copy list for the thread and that are located in the exhausted thread-local heap, to the outside of the thread-local heap, and modifies the pointers to the copied objects (steps 410 and 415).

Here, the copying operation and the pointer modifying operation may be performed using the existing copying GC algorithm, and they are performed using normal write instructions. Some algorithms for modifying the pointer may embed a forward pointer in the original object. For such a write operation that destroys the original object, a write instruction for transaction is used.

Next, the garbage collector 238 uses a write instruction for transaction to change the pointer fields in the shared objects registered in the copy list so as to point to the new copies of the objects (step 420). When the above-described processing is finished for all the registered shared objects, the garbage collector 238 empties the copy list (step 425), and commits the transaction (step 430). Committing the transaction enables any data written for the transaction till then to be atomically visible from other threads.

If it is determined in step 405 that it is not allowed to copy the shared objects, or from step 430, the process proceeds to step 435, where the garbage collector 238 marks the objects reachable from the registers or the stack of the thread, and for those objects, uses a normal write instruction to modify the pointers to the copied shared objects.

Then, the garbage collector 238 determines again whether the shared objects in the exhausted thread-local heap can be copied (step 440). If it is possible to copy the shared objects (YES in step 440), i.e., if no conflict has been detected in relation to the thread to which the thread-local heap has been assigned, the garbage collector 238 collects unmarked objects irrespective of their attributes (step 450). Then, the garbage collector 238 lastly starts the transaction (step 455), and the process is terminated.

On the other hand, if it is not allowed to copy the shared objects (NO in step 440), i.e., if a conflict has been detected in relation to the thread to which the thread-local heap is assigned, the garbage collector 238 collects unmarked objects whose attribute is "thread-local" (step 460). The process is then terminated. In the event that a conflict is detected after initiation of the process in step 405 and before the commitment of the transaction in step 430, the processing of the conflict handler 240 is started, interrupting the processing of the garbage collector 238. Thereafter, when the processing of the conflict handler 240 is finished, the processing of the garbage collector 238 is resumed from step 435. It should be noted that the processing from the point where the processing was interrupted down to the commitment of the transaction in step 430 is skipped.

Figure 5:
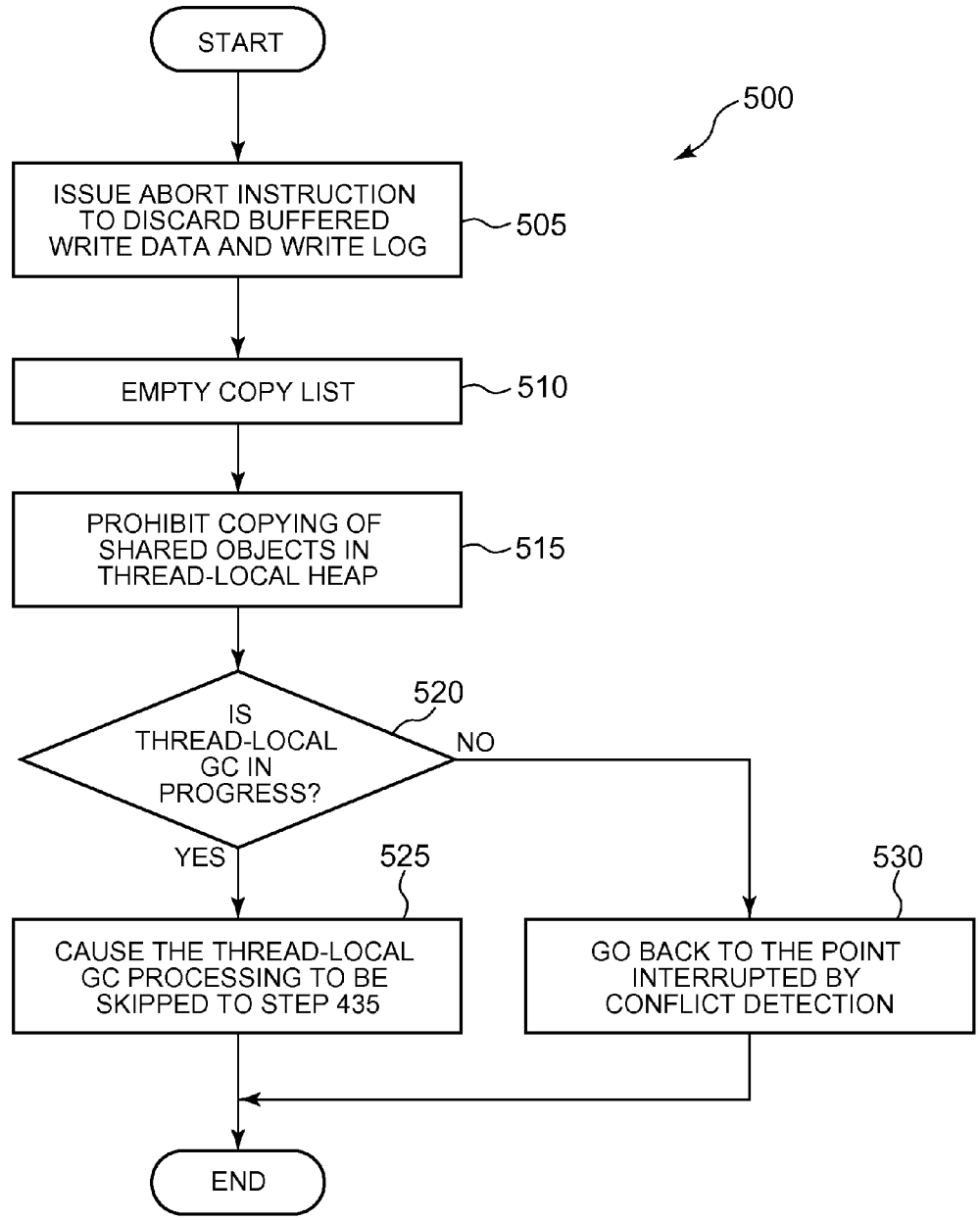
FIG. 5 is a flowchart illustrating, by way of example, a flow of processing performed by a conflict handler 240 according to the embodiment of the present invention.

FIG. 5 is a flowchart 500 illustrating a flow of the processing performed by the conflict handler 240 according to the embodiment of the present invention. The processing shown in FIG. 5 is started in the event that a conflict has been detected in the write log of the transactional memory, when the thread that had logged the data and has received the notification of the conflict detection calls the conflict handler 240. The conflict handler 240 issues an abort instruction to discard any buffered write data and any write log (step 505). It is noted, as described above, that the abort instruction used in one or more embodiments of the present invention only discards the buffered write data and the write log; it does not cause the execution to be rolled back to the starting point of the transaction.

Next, the conflict handler 240 empties the copy list for the thread that had logged the data (step 510), and prohibits copying of any shared object in the local area, or the thread-local heap, for the thread that had logged the data (step 515). As described above, the process of prohibiting copying may be performed, e.g., by setting an inhibit flag to the thread-local heap for the thread that had logged the data.

Lastly, the conflict handler 240 determines whether a GC is currently being performed by the garbage collector 238 (step 520), and if so (YES in step 520), the conflict handler 240 causes the garbage collector 238 to skip the processing from the point where the processing was interrupted by the conflict detection till the commitment of the transaction and to resume the processing from step 435 in the flowchart shown in FIG. 4 (step 525). On the other hand, if a GC is not in progress (NO in step 520), the conflict handler 240 goes back to the point where the processing was interrupted by the conflict detection, and returns the control (step 530). The process is then terminated.

As described above, when the conflict handler 240 is called during execution of a GC by the garbage collector 238, the transaction is terminated without being committed. This means that, even when a shared object has been copied, the result is invisible from other threads. In this case, although the area to which the shared object has been copied is wasted, there is no problem because the number of shared objects that will be copied in the copy-based thread-local GC at one time is considered to be small.

Figure 10A:
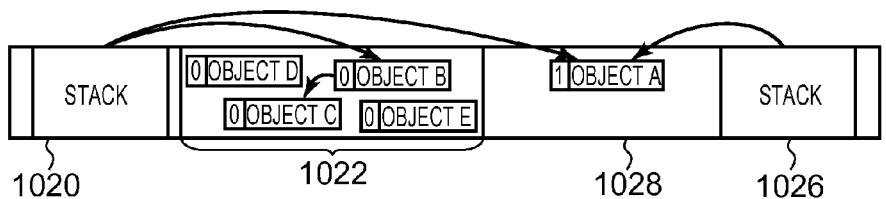
FIGS. 10A to 10D each show, by way of example, an operation of a conventional thread-local GC.

Hereinafter, an operation of the copy-based thread-local GC according to the embodiment of the present invention will be described by giving a specific example with reference to FIGS. 6A to 6E and 7A to 7D. Beforehand, an operation of the conventional thread-local GC will be described first with reference to FIGS. 10A to 10D so as to make the improvement by one or more embodiments of the present invention more understandable. FIG. 10A shows an initial state of a memory including a local area 1022 assigned to a thread X. In FIG. 10A, a stack 1020 and a stack 1026 are for the thread X and a thread Y, respectively, and an area 1028 is shared by a plurality of threads. In the figure, an arrow represents a pointer that indicates a reference relationship between the objects.

As shown in FIG. 10A, in the initial state, objects B to E are allocated in the local area 1022 for the thread X, and an object A is located in the shared area 1028. The numerical figure in the header of each object shows a bit value indicating its attribute. In the initial state, only the object A has a value "1", indicating that it is a shared object. Furthermore, the objects D and E are unreachable from any thread, and thus, they are no longer necessary, or unwanted objects.

Figure 10B:
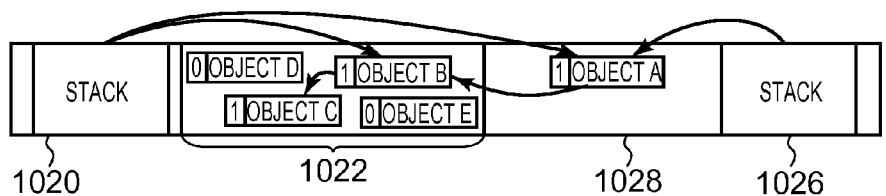

In the initial state shown in FIG. 10A, when the thread X is about to write into the object A a pointer that points from the object A to the object B, conventional write barrier is executed. In execution of the write barrier, objects are traced, starting at that pointer from the object A to the object B, and the attribute bits of the objects B and C are changed to "1", meaning that they are shared. FIG. 10B shows the state of the memory after execution of the conventional write barrier.

Figure 10C:
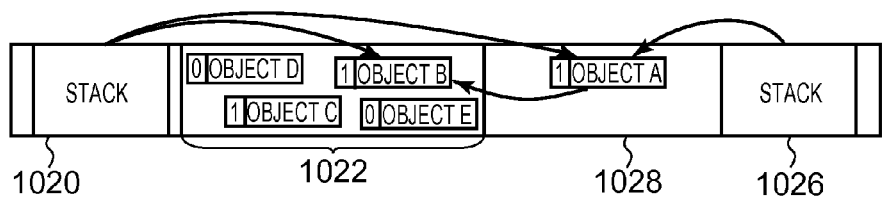
Figure 10D:
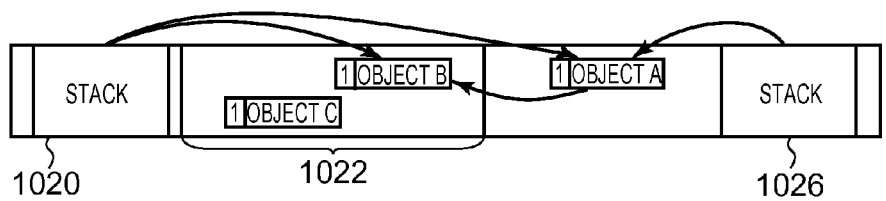

Next, assume in the state shown in FIG. 10B that the thread X erases from the object B the pointer pointing from the object B to the object C. Then, the local area 1022 for the thread X changes to the state as shown in FIG. 10C. Afterwards, when the local area 1022 for the thread X has been exhausted, the conventional thread-local GC is performed on the local area 1022. FIG. 10D shows the state of the memory after execution of the conventional thread-local GC.

In the conventional thread-local GC, any unwanted object is collected only if it is not shared. Thus, as shown in FIG. 10D, the object C whose attribute is "shared" is not collected and left in the local area 1022, even though it is no longer necessary. Furthermore, the object B, which is shared and not unwanted, may possibly be referenced from another thread, and therefore, it cannot be copied to the outside of the local area 1022. Thus, the shared object B also remains in the local area 1022.

As such, according to the conventional thread-local GC, the shared objects are left in the local area. As the GC is performed repeatedly, the number of uncollected shared objects increases, resulting in severe fragmentation. The shared objects left in the local area (the objects B and C in the example shown in FIG. 10D) are copied to the outside of the local area, or collected, only when a global GC is executed next time with all the threads stopped. Accordingly, the conventional thread-local GC suffers not only the problem of fragmentation, but also the problem that, when the global GC needs to be performed more often due to the fragmentation problem, all the threads would be stopped more frequently, leading to a longer pausing time.

FIGS. 6A to 6E show, by way of example, an operation of the copy-based thread-local GC according to an embodiment of the present invention in the case where no conflict is detected. FIG. 6A, which partly corresponds to FIG. 10A, shows initial states of a memory, which includes a local area 622 assigned to a thread X, and caches, which include a cache 603 included in a CPU 0, numbered 602, that is executing the thread X. It is noted that a CPU 1, numbered 610, which is executing a thread Y, similarly has a cache 611.

In FIG. 6A, a cache line 604 included in the cache 603 has a first bit 606 and a second bit 608 adjacent to the bit 606. When the value of the first bit 606 is "1", it indicates that the data in the cache line 604 is write data that has been logged. When the value of the bit 608 is "1", it indicates that the data in the cache line 604 is write data that has been buffered. The same applies to bits 614 and 616 in a cache line 612 in the cache 611.

In many implementations of the hardware transactional memory, bits are added to each cache line, in the above-described manner, to represent buffered write data and logged write data. The buffered write data is invisible from other threads. The logged write data becomes a target of conflict detection. When a transaction is committed, both bits are reset to "0".

The rest of FIG. 6A is basically identical to the corresponding part of FIG. 10A (e.g., portion 626 is analogous to portion 1026, and so on), and thus, description thereof will not be repeated here. In the copy-based thread-local GC, however, a one-bit inhibit flag 624 is set for each local area, so as to indicate whether copying of a shared object in that local area is permitted or not.

In the initial state shown in FIG. 6A, when the thread X is about to write into the object A a pointer that points from the object A to the object B, write barrier according to the embodiment of the present invention is executed. FIG. 6B shows the states of the memory and the caches after execution of the write barrier.

In execution of the write barrier according to the embodiment of the present invention, objects are traced, starting at that pointer pointing from the object A to the object B, and the attribute bits of the objects B and C are each changed to "1", indicating that the object is "shared". At this time, it is additionally determined whether a predetermined condition is satisfied, i.e., whether it is permitted to copy any shared object in the local area 622 for the thread X by referring to the inhibit flag 624, and whether the object A into which the pointer is to be written is located outside of the local area 622 for the thread X and the object B that is pointed to by the pointer to be written is located in the local area 622 for the thread X.

The initial state shown in FIG. 6A satisfies the predetermined condition described above. Accordingly, the pointer pointing from the object A to the object B is written using a write instruction for logging, and, as shown in FIG. 6B, a cache line including the object A is entered into the cache 603 for the CPU 0 that is executing the thread X, and the bit 606 is set to "1" to indicate that it is the logged write data. At this time, although not shown in the figure, the object A is registered in a copy list for the thread X as well.

Then, assume in the state shown in FIG. 6B that the thread X erases from the object B the pointer pointing from the object B to the object C and, afterwards, the local area 622 for the thread X has been exhausted and a GC is executed by the garbage collector 238. FIG. 6C shows the states of the memory and the caches after execution of the copying process performed in the copy-based thread-local GC.

In the GC performed by the garbage collector 238, the inhibit flag 624 is firstly checked to see whether it is possible to copy the shared objects in the local area 622 for the thread X, and, as shown in FIG. 6C, the object B in the local area 622, which is reachable from the object A being registered in the copy list for the thread X, is copied into the area 628 that is located outside of the local area 622. It is noted that the pointer of the object B is erased prior to execution of the copy-based thread-local GC, and thus in FIG. 6C, the pointer pointing from the object B to the object C has been erased.

When the copying process is finished, next, for the object A that is registered in the copy list for the thread X, the pointer field in the object A is changed, using a write instruction for transaction, so as to point to the new copy of the object B. FIG. 6D shows the states of the memory and the caches after execution of the pointer modifying process. Referring to FIG. 6D, the bits 606 and 608 are both set to "1", indicating that the data registered in the cache line 604 has been logged and buffered.

Next, the transaction is committed in the state shown in FIG. 6D, and thereafter, for any object traced from the register or the stack 620 of the thread X, the pointer to the copied shared object is modified using a normal write instruction. Further, any unwanted object in the local area 622 for the thread X is collected, irrespective of its attribute, and the GC by the garbage collector 238 is terminated. FIG. 6E shows the states of the memory and the caches after completion of the copy-based thread-local GC.

Referring to FIG. 6E, the values of both bits 606 and 608 have been reset to "0" as a result of commitment of the transaction. As the transaction has been committed, the pointer pointing from the object A to the new copy of the object B, which had been buffered, is written in the shared area 628 so that it is visible from other threads. Furthermore, the pointer in the stack 620 has been changed to point to the new copy of the object B. Still further, the objects that had become no longer necessary in the local area 622 for the thread X have all been collected, irrespective of their attributes.

As described above, according to the copy-based thread-local GC of one or more embodiments of the present invention, the conflict detection and the buffering mechanism in the transactional memory are used to regard a shared object as a thread-local object until another thread actually accesses the object, and copy the object to the outside of the local area. This considerably improves the problem of fragmentation, and also reduces the frequency of a global GC in which all the threads are stopped, resulting in a greatly shortened pausing time.

FIGS. 7A to 7D show, by way of example, an operation of the copy-based thread-local GC according to the embodiment of the present invention in the case where a conflict is detected. The operation until the conflict is detected is identical to that described above with reference to FIGS. 6A to 6E, and thus, description of FIG. 7A, corresponding to FIG. 6A showing the initial state, and FIG. 7B, corresponding to FIG. 6B showing the state after execution of the write barrier, will not be repeated here.

Figure 7A:
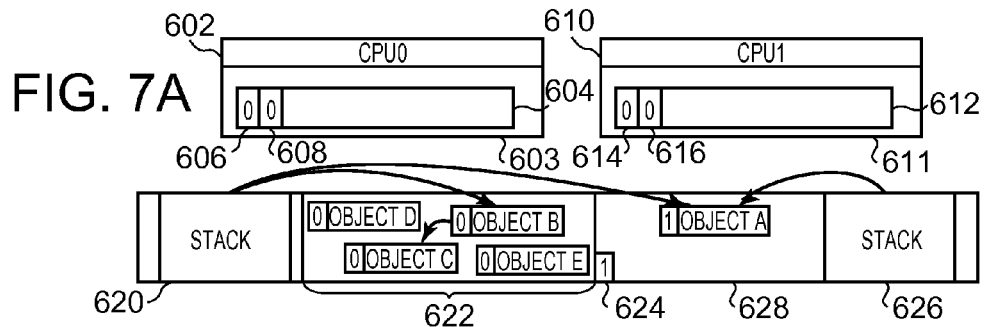
FIGS. 7A to 7D each show, by way of example, an operation of the improved thread-local GC according to the embodiment of the present invention in the case where a conflict is detected.
Figure 7B:
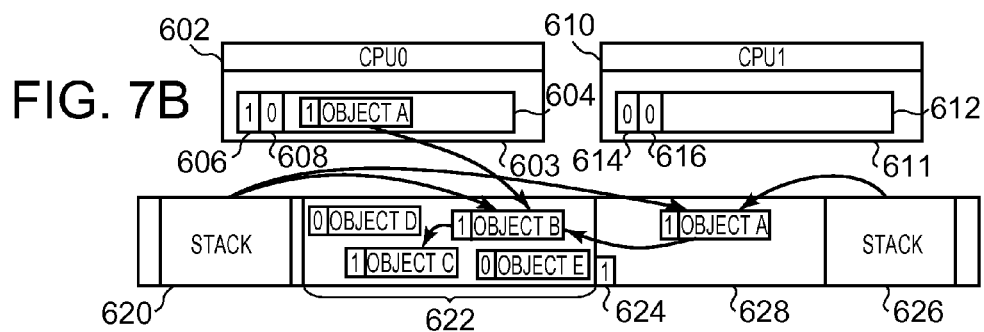
Figure 7C:
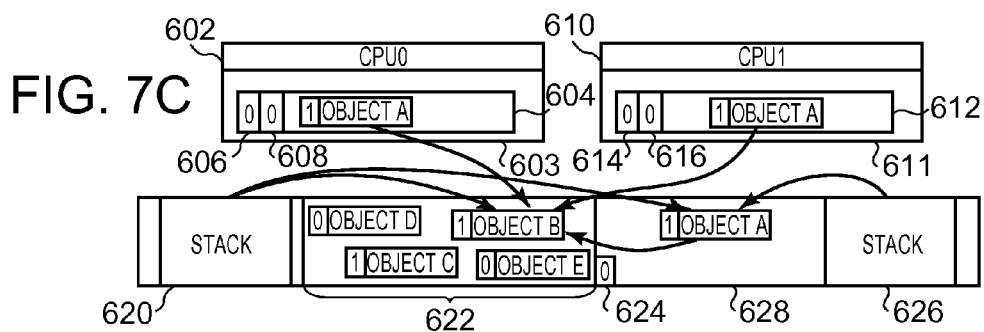

Now, assume in the state shown in FIG. 7B that the pointer for the object B pointing from the object B to the object C has been erased, and that the thread Y has read the object A and, as a result, a conflict has been detected. FIG. 7C shows the states of the memory including the local area 622 assigned to the thread X, the cache 603 included in the CPU 0 that is executing the thread X, and the cache 611 included in the CPU 1 that is executing the thread Y, after detection of the conflict.

As seen from FIG. 7C, as the thread Y has read the object A, a cache line including the object A is entered into the cache 611 for the CPU 1 that is executing the thread Y. Further, as a conflict has been detected due to this read operation, the transaction is aborted, and consequently, the bit 606 of the cache line 604 is reset to "0." Still further, as the conflict has been detected, the inhibit flag 624 corresponding to the local area 622 for the thread X is set to "0." indicating that "copying is prohibited."

Figure 7D:
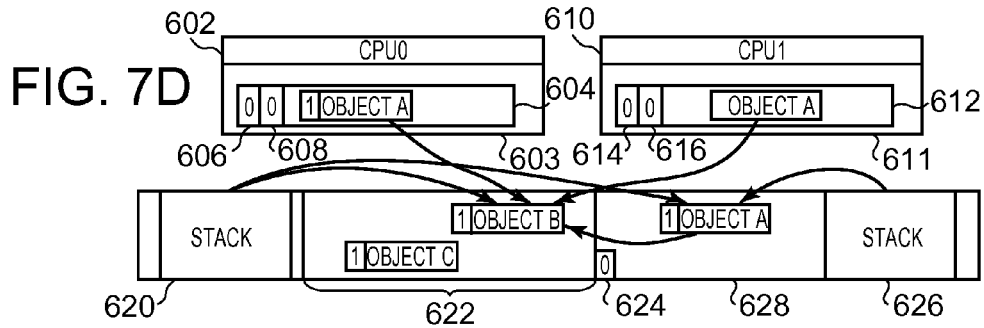

Thereafter, assume in the state shown in FIG. 7C that the local area 622 for the thread X has been exhausted and the copy-based thread-local GC according to the embodiment of the present invention has been executed. FIG. 7D shows the states of the memory and the caches after completion of the copy-based thread-local GC. As seen from FIG. 7D, in the copy-based thread-local GC, in response to detection of the conflict, any unwanted object whose attribute is not "shared" is collected, as in the case of the conventional thread-local GC, and as a result, the shared objects B and C remain in the local area 622.

As such, in the example shown in FIGS. 7A to 7D, the thread Y reads the object A prior to execution of a GC by the garbage collector 238, and thus, a conflict is detected. As a result, the object B cannot be copied to the outside of the local area 622 for the thread X. Moreover, once a conflict is detected, it is necessary to behave conservatively thereafter, so that the shared object C cannot be collected.

In an actual implementation of the hardware transactional memory, a conflict is detected in units of cache lines. Thus, in the above-described embodiment, description has been made for the case where copying of the shared objects is prohibited even when the thread Y has read from or written to a field in the object A that is other than the pointer field pointing to the object B, or even when the thread Y has read from or written to another object included in the same cache line. Essentially, however, the copying of the shared objects should be prohibited only when the thread Y has read the pointer field in the object A that points to the object B.

In view of the foregoing, as a modification of the above-described embodiment of the present invention, another method is proposed wherein an object that is located in a local area assigned to a thread and that is directly pointed to from a shared object located outside of the local area is registered in both a write log and a copy list. According to the modification, it is understood that the write barrier processing unit 236 shown in FIG. 2 operates in the following manner. In response to initiation of an operation by a thread of writing a pointer into a shared object whose attribute is "shared", the write barrier processing unit 236 finds one or more objects that are reachable by recursively tracing references, starting at the object that is pointed to by the pointer about to be written, and changes the attribute of any reachable object to "shared". Then, on the condition that any one of those shared objects, including the shared object into which the pointer is to be written, is located outside of the local area assigned to the thread and has a pointer that points to an object located in the local area, the write barrier processing unit 236 finds an object that is located in the local area and that is directly referenced from the shared object satisfying the above condition, and registers the found object in a write log of the transactional memory so as to set it as a target of conflict detection, and also registers the object in a copy list for the thread.

The flowchart illustrating the processing performed by the write barrier processing unit 236 according to the modification is basically identical to that shown in FIG. 1 except that what is registered in the copy list and the write log in steps 355 and 360 in FIG. 3 is the child object that has been registered in the set S most recently. Further, what is registered in the copy list and the write log in steps 380 and 385 in FIG. 3 is the object that is pointed to by the pointer about to be written.

Furthermore, according to the modification, it is understood that the garbage collector 238 shown in FIG. 2 operates in the following manner. In response to the event that any one of a plurality of local areas has been exhausted, in the case where no conflict is detected in relation to the thread to which the exhausted local area has been assigned, the garbage collector 238 copies any object that is reachable from any one of the shared objects registered in the copy list for the thread to the outside of the exhausted local area, and for each shared object registered in the copy list, the garbage collector 238 buffers write data for modifying the pointers to the copied objects so as to point to the new copies of the objects and registers the write data in a write log of the transactional memory, then commits the transaction, and collects any unwanted object, irrespective of its attribute, except for the shared objects registered in the copy list. In the case where a conflict is detected in relation to the thread to which the exhausted local area has been assigned, the garbage collector 238 collects any unwanted object having an attribute other than "shared" in the local area.

The flowchart illustrating the processing performed by the garbage collector 238 according to the modification is basically identical to that shown in FIG. 4, except that the process in step 450 in FIG. 4 is replaced with the process of collecting any unwanted object, irrespective of its attribute, excluding the shared objects registered in the copy list. It is noted that the conflict handler 240 according to the modification is identical to the conflict handler 240 that has been described above with reference to FIGS. 2 and 5, and therefore, description thereof will not be repeated here.

In the example shown in FIGS. 7A to 7D, the object B is registered in the write log and the copy list in the modification. According to the modification, the object B that is directly pointed to from the shared object located outside of the thread-local heap cannot be copied to the outside of the local area, irrespective of whether a conflict is detected or not. According to the modification, however, a conflict is detected only when the object B that is directly pointed to from the shared object located outside of the thread-local heap is actually accessed from another thread, and therefore, the probability of detection of the conflict is lowered. Furthermore, the shared object C that is no longer necessary can be collected as long as no conflict is detected.

In the embodiment and its modification described above, once the operation of copying the shared objects is prohibited in a thread-local heap, thereafter, the copying operation is prohibited permanently in that thread-local heap, as in the conventional thread-local GC. However, if the shared object for which the copying operation has been prohibited due to detection of a conflict is marked and such a marked shared object is excluded from the target of the collecting and copying operations, then it may be possible, even after the detection of the conflict, to perform the copy-based thread-local GC on the thread-local heap in which that shared object is allocated.

In view of the foregoing, as another embodiment of the present invention, the following memory management device is provided. The memory management device includes a plurality of processors implementing transactional memory, and a memory having its part assigned as a plurality of local areas corresponding respectively to a plurality of running threads. According to the other embodiment, it is understood that the write barrier processing unit 236 shown in FIG. 2 operates in the following manner. In response to initiation of an operation by a thread of writing a pointer into a shared object whose attribute is shared, the write barrier processing unit 236 finds one or more objects reachable by recursively tracing references, starting at an object that is pointed to by the point about to be written, and changes the attribute of any reachable object to "shared". On the condition that any one of those shared objects, including the shared object into which the pointer is to be written, is located outside of a local area corresponding to the thread and has a pointer pointing to an object located in the local area, the write barrier processing unit 236 registers the pointer in the shared object satisfying the condition into a write log of the transactional memory so as to set it as a target of conflict detection, and also registers the shared object satisfying the condition in a copy list for the thread. As such, the flowchart illustrating the processing performed by the write barrier processing unit 236 according to the other embodiment becomes identical to that shown in FIG. 1 and therefore, description thereof will not be repeated here.

Further, according to the other embodiment, it is understood that the conflict handler 240 shown in FIG. 2 operates in the following manner. In response to detection of a conflict, the conflict handler 240 discards any buffered write data and any registered write log of the transactional memory in relation to the shared object for which the conflict has been detected, and marks any object reachable from the shared object that is contained in the copy list and for which the conflict has been detected. The flowchart illustrating the processing performed by the conflict handler 240 according to the other embodiment is basically identical to that shown in FIG. 5, except that the process in step 515 in FIG. 5 is replaced with the process of marking any object reachable from the shared object that is contained in the copy list and for which the conflict has been detected. Further, the process in step 525 in FIG. 5 is replaced with a process of causing the execution to be rolled back to the starting point of the transaction.

Furthermore, according to the other embodiment, it is understood that the garbage collector 238 shown in FIG. 2 operates in the following manner. In response to the event that one of the plurality of local areas has been exhausted, the garbage collector 238 finds one or more unmarked objects that are reachable from any one of the shared objects registered in the copy list for the thread to which the exhausted local area has been assigned, and copies each of the found objects to the outside of the exhausted local area. For each shared object registered in the copy list, the garbage collector 238 buffers write data for modifying the pointers to the copied objects so as to point to the new copies of the objects, registers the same in the write log of the transactional memory, and commits the transaction. The garbage collector 238 then collects any unwanted object, except for the marked objects.

The flowchart illustrating the processing performed by the garbage collector 238 according to the other embodiment is basically identical to that shown in FIG. 4, except that steps 405, 440, and 460 in FIG. 4 become unnecessary. Furthermore, the processes in steps 410 and 450 in FIG. 4 are performed in the state where any object marked by the conflict handler 240 is excluded from the processing target.

Hereinafter, with reference to FIGS. 8 and 9, the effects of one or more embodiments of the present invention will be discussed through comparison with the conventional thread-local GC. Firstly, referring to FIG. 8, operations performed on objects of different categories by the conventional thread-local GC and by the copy-based thread-local GC according to an embodiment of the present invention will be described. Then, the ratios of the objects of respective categories in the objects that are generated during a predetermined period and under a predetermined condition are shown, to thereby demonstrate the significant effects obtained by one or more embodiments of the present invention.

The table in FIG. 8 shows the operations of the conventional thread-local GC and the copy-based thread-local GC according to the embodiment of the present invention for each category of objects. Objects newly generated during a period between a thread-local GC and an immediately succeeding thread-local GC are classified into six categories as shown in FIG. 8 at the starting point of the second thread-local GC. In FIG. 8, "Live" means that the object is reachable from a register or a stack of a thread. "Dead" means that the object is no longer referenced from any thread. "Thread-local" means that the attribute of the object is "thread-local", and "Global" means that the attribute of the object is "shared". Furthermore. "Global and accessed from multiple threads" means that the object has the "shared" attribute and has actually been accessed from a plurality of threads.

As shown in FIG. 8, the operations for an object having the "thread-local" attribute, whether it is live or dead, by the conventional thread-local GC and the inventive copy-based thread-local GC are identical to each other. The "live" object is subjected to compaction or forced out, while the "dead" object is collected. On the other hand, the operations for an object having the "shared" attribute by the conventional thread-local GC and the inventive copy-based thread-local GC are different from each other. In FIG. 8, the terminology "present invention" is for convenience and refers to one or more embodiments but is not intended to limit the claim scope beyond limitations expressly recited therein.

In the conventional thread-local GC, any shared object is excluded from the target of collection, irrespective of whether the object is live or dead. This causes fragmentation in the conventional thread-local GC. On the other hand, in the copy-based thread-local GC of one or more embodiments of the present invention, any live shared object is forced out of the thread-local heap as long as there is no object that is global and accessed from multiple threads in the thread-local heap, so that fragmentation is avoided. Further, any dead shared object is collected as long as the thread-local heap includes no object that is global and accessed from multiple threads, whereby fragmentation is avoided.

The operations for an object that is global and accessed from multiple threads by the conventional thread-local GC and the inventive copy-based thread-local GC are identical to each other irrespective of whether the object is live or dead, except for the following points. In the copy-based thread-local GC according to one or more embodiments of the present invention, detection of a conflict makes it unable to force a live shared object out of the thread-local heap and to collect a dead shared object, resulting in fragmentation.

The graph in FIG. 9 shows a result of analysis, performed using SPECjbb2005, as to which one of the six categories shown in FIG. 8 the objects generated during a period from a GC to a next GC belong to at the starting point of the second GC. In FIG. 9, the horizontal axis represents a size of the thread-local heap that is assigned to a thread, and the vertical axis represents the ratios of the respective object categories in the thread-local heap of each size. It is noted that because it is difficult to check whether a shared object has been accessed from a plurality of threads, and because a lock conflict would barely occur in long-live objects in SPECjbb2005, the ratios are actually examined for four categories in FIG. 9, assuming that a newly generated object would not be accessed from two or more objects before the next GC.

While the ratios of the four object categories are shown for the thread-local heaps of different sizes in FIG. 9, they are not the ratios obtained by actually implementing the thread-local heaps. Rather, they are approximated by the following: thread-local heap size per thread=(JAVA heap size−size of long-lived objects)/8. Referring to the graph in FIG. 9, the total size of the shared objects exceeds 50% of the thread-local heap size, except for the case of the 32 MB heap. This means that the conventional thread-local GC will cause very severe fragmentation and that one-time thread-local GC will be able to collect only less than half objects. On the other hand, the dead shared objects make up about 50% of the entirety, and the copy-based thread-local GC of one or more embodiments of the present invention can collect all the dead shared objects. Moreover, the inventive copy-based thread-local GC can force the live shared objects out of the thread-local heap.

In the graph shown in FIG. 9, focusing on the ratio of the shared objects for each thread-local heap size, the ratio of the shared objects is not decreased even when the thread-local heap size is reduced. This ensures unvarying usefulness of the copy-based thread-local GC of one or more embodiments of the present invention over the conventional method. When the size of the thread-local heap is reduced, the probability of an access to a shared object in the thread-local heap from another thread is expected to be lowered. Accordingly, in the copy-based thread-local GC of one or more embodiments of the present invention, it is more advantageous to reduce the size of the thread-local heap. However, attention should be paid because, when the size of the thread-local heap is too small, the frequency of the thread-local GC may possibly be increased, which may ultimately result in an increased ratio of the GC processing time to the overall runtime, leading to degradation in throughput.

Having reviewed the disclosure herein, the skilled artisan will appreciate that aspects of the present invention may be implemented using integrated circuit chips which can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any suitable product that includes integrated circuit chips.

Furthermore, having reviewed the disclosure herein, the skilled artisan will appreciate that aspects of the present invention may be embodied as a system, method or computer program product. Accordingly, aspects of the present invention may take the form of an embodiment making significant use of hardware, or an embodiment combining software (including firmware, resident software, micro-code, etc.) and hardware aspects that may all generally be referred to herein as a "circuit." "module" or "system." Furthermore, aspects of the present invention may take the form of a computer program product embodied in one or more computer readable medium(s) having computer readable program code embodied thereon.

Accordingly, computer software including instructions or code for performing the methodologies of the invention, as described herein, may be stored in one or more of the associated memory devices (for example. ROM, fixed or removable memory) and, when ready to be utilized, loaded in part or in whole (for example, into RAM) and implemented by a CPU. Such software could include, but is not limited to, firmware, resident software, microcode, and the like.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable. RF. etc. or any suitable combination of the foregoing.

Computer program code for carrying out operations for aspects of the present invention may be written in any combination of one or more programming languages.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams, corresponding to logic in the flow charts, and/or described herein. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

The terminology used herein is for the purpose of describing particular embodiments only and is not intended to be limiting of the invention. As used herein, the singular forms "a", an and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A memory management device including a plurality of processors implementing transactional memory, the memory management device comprising:
- a memory having a plurality of local areas corresponding respectively to a plurality of running threads;
- a write barrier processing unit, operative in response to initiation of an operation by one of the threads to:
  - write a pointer into a shared object having an attribute of "shared,"
  - find any object that is reachable by recursively tracing references, starting at an object pointed to by the pointer to be written, and change an attribute of the found object to "shared" so as to make it a shared object, and
  - on the condition that any one of the shared objects including the shared object into which the pointer is to be written is located outside of the local area corresponding to the thread and has a pointer pointing to an object located in the local area, to register the pointer in the shared object satisfying the condition in a write log of the transactional memory so as to set the same as a target of conflict detection, and also register the shared object satisfying the condition in a copy list for the thread; and
- a garbage collector, operative in response to exhaustion of one of the plurality of local areas, to:
  - in the case where no conflict is detected in relation to the thread to which the exhausted local area has been assigned, copy any object reachable from any one of the shared objects registered in the copy list for the thread to the outside of the exhausted local area, and, for each shared object registered in the copy list, buffer write data for modifying the pointer to the copied object so as to point to a new copy of the object and register the same in the write log of the transactional memory, commit a transaction, and collect any unwanted object irrespective of its attribute, and
  - in the case where a conflict is detected in relation to the thread to which the exhausted local area has been assigned, collect from the local area any unwanted object having an attribute other than "shared."

2. The memory management device according to claim 1, further comprising a conflict handler, operative in response to the detection of the conflict, to discard the buffered write data and the registered write log of the transactional memory in relation to the shared object for which the conflict has been detected, and prohibit copying of any shared object located in the local area for the thread having the copy list including the shared object for which the conflict has been detected.

3. The memory management device according to claim 2, wherein in the case where a conflict is detected after initiation of the processing by the garbage collector and before the commitment of the transaction thereby, the conflict handler causes the garbage collector to skip remaining processing down to the commitment of the transaction and perform the processing from the collection of any unwanted object having an attribute other than "shared."

4. The memory management device according to claim 1, wherein:
- the write barrier processing unit registers, instead of the pointer in the shared object satisfying the condition, an object that is located in the local area and directly referenced by the shared object satisfying the condition in the write log of the transactional memory so as to set the same as a target of conflict detection, and also registers the object in the copy list for the thread, and
- in the case where no conflict is detected, the garbage collector collects, instead of any unwanted object irrespective of its attribute, any unwanted object except for the objects registered in the copy list, irrespective of its attribute.

5. A memory management device including a plurality of processors implementing transactional memory, the memory management device comprising:
- a memory having a plurality of local areas corresponding respectively to a plurality of running threads;
- a write barrier processing unit, operative in response to initiation of an operation by one of the threads to:
  - write a pointer into a shared object having an attribute of "shared,"
  - find any object that is reachable by recursively tracing references, starting at an object pointed to by the pointer to be written, and change an attribute of the found object to "shared" so as to make it a shared object, and
  - on the condition that any one of the shared objects including the shared object into which the pointer is to be written is located outside of the local area corresponding to the thread and has a pointer pointing to an object located in the local area, register the pointer in the shared object satisfying the condition in a write log of the transactional memory so as to set the same as a target of conflict detection, and also register the shared object satisfying the condition in a copy list for the thread;
- a conflict handler, operative in response to detection of a conflict, to discard buffered write data and registered write log of the transactional memory in relation to the shared object for which the conflict has been detected, and mark any object reachable from the shared object that is contained in the copy list and for which the conflict has been detected; and
- a garbage collector, operative in response to exhaustion of one of the plurality of local areas, to copy any unmarked object reachable from any one of the shared objects registered in the copy list for the thread to which the local area has been assigned, to the outside of the exhausted local area, and, for each shared object registered in the copy list, buffer write data for modifying the pointer to the copied object so as to point to a new copy of the object and register the same in the write log of the transactional memory, commit a transaction, and collect any unwanted object except for the marked objects.

6. A memory management method performed in a memory management device, the memory management device including a plurality of processors implementing transactional memory and a memory having a plurality of local areas corresponding respectively to a plurality of running threads, the memory management method comprising:
- a step, performed by a processor executing a thread that calls a write barrier module, in response to initiation of an operation by the thread to write a pointer into a shared object having an attribute of "shared," to find any object that is reachable by recursively tracing references, starting at an object pointed to by the pointer to be written, and change an attribute of the found object to "shared" so as to make it a shared object;
- a step, performed by the processor executing the thread that calls the write barrier module, in response to the change of the attribute, on the condition that any one of the shared objects including the shared object to which the pointer is to be written is located outside of the local area corresponding to the thread and has a pointer pointing to an object located in the local area, to register the pointer in the shared object satisfying the condition in a write log of the transactional memory so as to set the same as a target of conflict detection, and also register the shared object satisfying the condition in a copy list for the thread; and a step, performed by the processor executing the thread that calls a garbage collector, in response to exhaustion of the local area assigned to the thread, in the case where no conflict is detected in relation to the thread, to copy any object reachable from any one of the shared objects registered in the copy list for the thread to the outside of the exhausted local area, and, for each shared object registered in the copy list, buffer write data for modifying the pointer to the copied object so as to point to a new copy of the object and register the same in the write log of the transactional memory, commit a transaction, and collect any unwanted object irrespective of its attribute, and in the case where a conflict is detected in relation to the thread, to collect from the local area any unwanted object having an attribute other than "shared."

7. The memory management method according to claim 6, further comprising a step, performed by the processor executing the thread that calls a conflict handler, in response to the detection of the conflict, to discard the buffered write data and the registered write log of the transactional memory in relation to the shared object for which the conflict has been detected, and prohibit copying of any shared object located in the local area assigned to the thread.

8. The memory management method according to claim 6, wherein:

the processor executing the thread that calls the write barrier module registers, instead of the pointer in the shared object satisfying the condition, an object that is located in the local area and directly referenced by the shared object satisfying the condition in the write log of the transactional memory so as to set the same as a target of conflict detection, and also registers the object in the copy list for the thread, and in the case where no conflict is detected, the processer executing the thread that calls the garbage collector collects, instead of any unwanted object irrespective of its attribute, any unwanted object except for the objects registered in the copy list, irrespective of its attribute.

9. A computer program product for memory management performed in a memory management device, the memory management device including a plurality of processors implementing transactional memory and a memory having a plurality of local areas corresponding respectively to a plurality of running threads, the computer program product comprising:

a nontransitory tangible computer readable storage medium having computer readable program code embodied therewith, the computer readable program code comprising:

computer readable program code comprising a write barrier module, the write barrier module causing each of the plurality of processors to perform the steps of:

in response to initiation of an operation, by a thread running on the processor, to write a pointer into a shared object having an attribute of "shared," finding any object that is reachable by recursively tracing references, starting at an object pointed to by the pointer to be written, and changing an attribute of the found object to "shared" so as to make it a shared object; and in response to the change of the attribute, on the condition that any one of the shared objects including the shared object to which the pointer is to be written is located outside of the local area corresponding to the thread and has a pointer pointing to an object located in the local area, registering the pointer in the shared object satisfying the condition in a write log of the transactional memory so as to set the same as a target of conflict detection, and also registering the shared object satisfying the condition in a copy list for the thread;

computer readable program code comprising a garbage collector, the garbage collector causing each of the plurality of processors to perform the step of:

in response to exhaustion of the local area assigned to the thread running on the processor:

in the case where no conflict is detected in relation to the thread, copying any object reachable from any one of the shared objects registered in the copy list for the thread to the outside of the exhausted local area, and, for each shared object registered in the copy list, buffering write data for modifying the pointer to the copied object so as to point to a new copy of the object and registering the same in the write log of the transactional memory, committing a transaction, and collecting any unwanted object irrespective of its attribute, and in the case where a conflict is detected in relation to the thread, collecting from the local area any unwanted object having an attribute other than "shared."

10. The computer program product for memory management according to claim 9, wherein:

the computer readable program code comprising the write barrier module causes each of the plurality of processors to perform the step of registering, instead of the pointer in the shared object satisfying the condition, an object that is located in the local area and directly referenced from the shared object satisfying the condition in the write log of the transactional memory so as to set the same as a target of conflict detection, and also registering the object in the copy list for the thread, and the computer readable program code comprising the garbage collector causes each of the plurality of processors to perform the step of, in the case where no conflict is detected, instead of collecting any unwanted object irrespective of its attribute, collecting any unwanted object except for the objects registered in the copy list, irrespective of its attribute.

11. A computer program product for memory management performed in a memory management device, the memory management device including a plurality of processors implementing transactional memory and a memory having a plurality of local areas corresponding respectively to a plurality of running threads, the computer program product comprising:

a nontransitory tangible computer readable storage medium having computer readable program code embodied therewith, the computer readable program code comprising:

computer readable program code comprising a write barrier module, the write barrier module causing each of the plurality of processors to perform the steps of:

in response to initiation of an operation, by the thread running on the given processor, to write a pointer into a shared object having an attribute of "shared," finding any object that is reachable by recursively tracing references, starting at an object pointed to by the pointer to be written, and changing an attribute of the found object to "shared" so as to make it a shared object; and in response to the change of the attribute, on the condition that any one of the shared objects including the shared object to which the pointer is to be written is located outside of the local area corresponding to the thread and has a pointer pointing to an object located in the local area, registering the pointer in the shared object satisfying the condition in a write log of the transactional memory so as to set the same as a target of conflict detection, and also registering the shared object satisfying the condition in a copy list for the thread;

computer readable program code comprising a conflict handler, the conflict handler causing each of the plurality of processors to perform the step of:

in response to notification of a conflict detection to the thread running on the processor, discarding buffered write data and registered write log of the transactional memory in relation to the shared object for which the conflict has been detected, and marking any object reachable from the shared object that is contained in the copy list and for which the conflict has been detected;

computer readable program code comprising a garbage collector, the garbage collector causing each of the plurality of processors to perform the step of:

in response to exhaustion of the local area assigned to the thread running on the processor, copying any unmarked object reachable from any one of the shared objects registered in the copy list for the thread, to the outside of the exhausted local area, and, for each shared object registered in the copy list, buffering write data for modifying the pointer to the copied object so as to point to a new copy of the object and registering the same in the write log of the transactional memory, committing a transaction, and collecting any unwanted object except for the marked shared objects.

* * * * *